(12) United States Patent  
Boudreau et al.

(10) Patent No.: US 10,097,300 B2  
(45) Date of Patent: *Oct. 9, 2018

(54) FRACTIONAL FREQUENCY REUSE IN HETEROGENEOUS NETWORKS

(71) Applicant: Telefonaktiebolaget L M Ericsson (publ), Stockholm (SE)

(72) Inventors: Gary David Boudreau, Kanata (CA); Konstantinos Dimou, Stockholm (SE); Laetitia Falconetti, Aachen (DE); Jörg Huschke, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 673 days.

This patent is subject to a terminal disclaimer.

(21) Appl. No.: 13/949,788

(22) Filed: Jul. 24, 2013

(65) Prior Publication Data

US 2013/0310060 A1 Nov. 21, 2013

Related U.S. Application Data

(60) Division of application No. 13/110,385, filed on May 18, 2011, now Pat. No. 8,559,961, which is a (Continued)

(51) Int. Cl.
*H04W 72/00* (2009.01)
*H04J 11/00* (2006.01)
(Continued)

(52) U.S. Cl.
CPC .......... *H04J 11/005* (2013.01); *H04W 16/32* (2013.01); *H04W 72/0453* (2013.01)

(58) Field of Classification Search
None
See application file for complete search history.

(56) References Cited

U.S. PATENT DOCUMENTS 5,950,127 A 9/1999 Nitta et al.
8,165,098 B2 * 4/2012 Teo ................. H04L 5/0037
370/335

(Continued)

FOREIGN PATENT DOCUMENTS

EP 2 077 685 A1 7/2009
EP 2 180 739 A1 4/2010
EP 2180739 * 4/2010

OTHER PUBLICATIONS

EP Office Action dated Jul. 24, 2014 in EP application 11807738.7.
(Continued)

*Primary Examiner* — Shantell L Heiber
(74) *Attorney, Agent, or Firm* — Baker Botts, LLP

(57) ABSTRACT

A base station node (BS) of a heterogeneous radio access network comprises a terminal locator (34) and a scheduler (36). The terminal locator (34) obtains an indication of location of a wireless terminal (30) in a cell served by the base station (BS), e.g., whether the wireless terminal (30) is in a center region (M) or an edge region (E) for the cell served by the base station node (BS). The scheduler (36) uses the indication of location to assign to the wireless terminal (30) a frequency of a frequency bandwidth usable by the heterogeneous radio access network. The scheduler (36) assigns a frequency from a partitioned portion of the frequency bandwidth if the cell served by the base station node is a micro cell and the wireless terminal is in an edge region of a micro cell. The scheduler (36) also assigns a frequency of the frequency bandwidth if the cell served by the base station node is a micro cell and the wireless terminal is in a center portion of the micro cell.

8 Claims, 36 Drawing Sheets

Related U.S. Application Data continuation-in-part of application No. PCT/EP2010/007699, filed on Dec. 15, 2010.

(51) Int. Cl.
*H04W 16/32* (2009.01)
*H04W 72/04* (2009.01)

(56) References Cited

U.S. PATENT DOCUMENTS

| | | |
|---|---|---|
| 2004/0223483 A1 | 11/2004 | Cooper |
| 2005/0037763 A1 | 2/2005 | Hamamoto et al. |
| 2006/0209721 A1 | 9/2006 | Mese et al. |
| 2007/0159993 A1* | 7/2007 | Classon .............. H04W 72/048 370/319 |
| 2010/0113059 A1* | 5/2010 | Morimoto ............. H04W 16/02 455/452.2 |
| 2010/0261493 A1 | 10/2010 | Guey et al. |

OTHER PUBLICATIONS

International Preliminary Report on Patentability dated Apr. 10, 2013 in corresponding PCT Application No. PCT/IB2011/002977.
Simonsson et al, "Frequency Reuse and Intercell Interference Co-ordination in E-UTRA", IEEE VTS Vehicular Technology Conference Proceedings, US, Apr. 1, 2007, pp. 3091-3095.
International Search Report and Written Opinion dated Feb. 14, 2012 in PCT Application No. PCT/IB2011/002977.
3GPP TS 36.423. VI0.0.0; 3rd Generation Partnership Project; Technical Specification Group Radio Access Network; Evolved Universal Terrestrial Radio Access Network (E-UTRAN); X2 application protocol (X2AP) (Release 10); Dec. 2010.

* cited by examiner

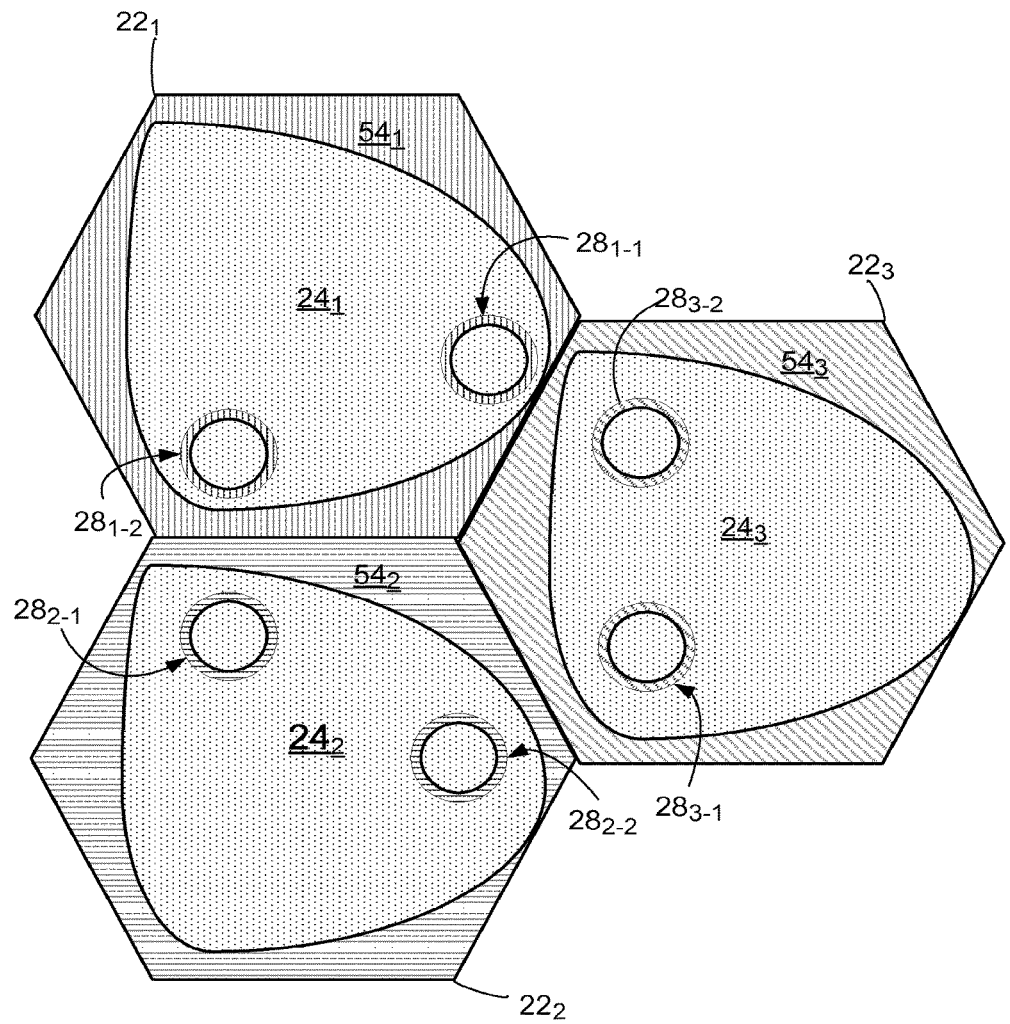
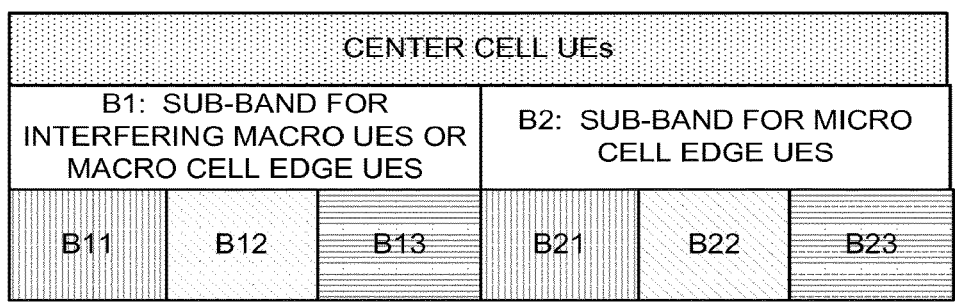
Fig. 15

FRACTIONAL FREQUENCY REUSE IN HETEROGENEOUS NETWORKS

This application is a divisional of U.S. patent application Ser. No. 13/110,385, filed May 18, 2011, which is a continuation-in-part of PCT application PCT/EP2010/007699, filed Dec. 15, 2010, entitled "Technique for Inter-Cell Interference Coordination in a Heterogeneous Communication Network", both of which are incorporated herein by reference in their entirety.

TECHNICAL FIELD

This invention pertains to telecommunications, and particularly to resource allocation in telecommunications networks.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station node, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the $3^{rd}$ Generation Partnership Project (3GPP) and this work continues in the coming 3GPP releases. The EPS comprises the Evolved Universal Terrestrial Radio Access Network (E-UTRAN) (also known as the Long Term Evolution (LTE) radio access) and the Evolved Packet Core (EPC) (also known as System Architecture Evolution (SAE) core network). E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes (eNodeB's in LTE) and the core network. As such, the radio access network (RAN) of an EPS system has an essentially "flat" architecture comprising radio base station nodes without reporting to radio network controller (RNC) nodes.

In a homogeneous deployment with a single cell layer, the transceiver devices that are sensitive to interference are usually also the ones that cause high interference to transceiver devices in adjacent cells. In the uplink (UL) the reason for this concurrence is the following: a sensitive transceiver device is one that has high pathloss to the serving base station, and therefore the power received by the serving base station is low, in particular if the transceiver device reaches its power limit. A transceiver device with high pathloss is typically at the cell border (commonly called cell-edge transceiver device), which is where it is also closest to adjacent cells (and adjacent base stations). For these adjacent cells the transceiver device (especially when operating at its power limit) is typically a strong interferer.

The growing demands on mobile networks to support data applications at higher throughputs and spectral efficiencies has driven the need to develop Orthogonal Frequency Division Multiplexing (OFDM)-based $4^{th}$ generation (4G) networks including for 3GPP Long Term Evolution (LTE). A key objective with respect to deployment of OFDM 4G networks is to utilize a frequency re-use of one (denoted by N=1), or as close to N=1 re-use as is practical. A frequency re-use of N=1 implies that the base stations in cells transmit on all available time-frequency resources blocks (RBs) simultaneously. Due to transmit power limitations in mobile terminals, the need for higher throughputs in 4G networks, especially near the cell edge, combined with the constraint on the uplink link budget will necessitate the need for smaller cell sizes than is typically deployed for present $2^{nd}$ generation (2G) and $3^{rd}$ generation (3G) cellular systems.

The use of smaller cells sizes can be deployed in a traditional homogenous cell splitting approach or in a more ad hoc heterogeneous approach in which pico cells or relay nodes are overlaid on an existing macro cellular network. For both a homogeneous and heterogeneous approach, the resulting interference limited system for N=1 deployment will not achieve the full potential capacity that the LTE standard can support without the implementation at the base station and mobile terminal of one or more viable interference mitigation and or cancellation techniques.

Interference cancellation and mitigation techniques have been investigated and deployed with varying degrees of success in terrestrial mobile networks for over twenty years. Traditional approaches to interference mitigation between transmitted signals have focused on either ensuring orthogonality between transmitted signals in time, frequency as well as spatially or by actively removing and cancelling interfering signals from the desired signal if orthogonality between the desired signal and potential interferes cannot be achieved. In early 2G cellular systems such orthogonality was achieved primarily through static pre-planned allocations of radio resources.

3G systems introduced interference cancellation techniques based mostly on a combination of blind information gathering at a base station such as spectrum usage monitoring and coarse exchange of interference indicators such as the Rise over Thermal (RoT) indicator employed in the 3GPP2 1×EV-DO standard. Typically interfering signals have been estimated using blind detection and their estimates subtracted from the desired signals.

From a link perspective the downlink (DL) allows for a more tractable analysis since if the desired mobile terminal location is known, the distances to all potential interfering base stations can be easily determined based on the network geometry and hence a probabilistic based estimate of the signal-to-interference-plus-noise (SINR) can be calculated based on the channel fading conditions for the desired signal and the interfering signals. In addition to additive white Gaussian noise (AWGN), both the desired signal and interfering signals will experience shadowing which typically is log-normally distributed.

Analysis of the uplink (UL) interference requires knowledge of not only the location of the desired mobile terminal under consideration, but also the relative locations of all potential interfering mobile terminals, for which both the locations of the interfering terminals, the number of potential terminals as well as their spatial velocity will be random variables.

In cellular networks it is a well known problem that, in medium to heavy loading, the network becomes interference limited which can result in negative signal-to-interference-plus-noise (SINR) ratios, particularly for cell edge users.

The challenge with deploying a static N=1 frequency re-use OFDM system in an interference limited environment is that for a fully loaded deployment, significant regions of coverage will experience negative SINR levels resulting in gaps in the deployed coverage, irrespective of the inter-cell distance. In an interference limited system it is not uncommon for on the order of 15% of users to experience negative SINR, with some users experiencing negative SINR levels of −10 to −15 dB. It should be noted that in a fully loaded interference limited cellular deployment the severity of the SINR degradation will be highly dependent on the average path loss exponent. For a cellular deployment with a fixed inter-cell distance, high path loss propagation environments with path loss exponents up to a $5^{th}$ or $6^{th}$ order will experience less overall interference than deployments with lower path loss exponents, since potential interfering signals from neighboring cells will be more greatly attenuated in the former case. Even though there will be significant SINR variation depending on the propagation environment, in order to robustly deploy an LTE OFDM system one will have to mitigate the inevitable negative SINR coverage regions that will exist.

Fractional frequency re-use (FFR) is one approach that can be statically or adaptively employed in heterogeneous cellular network deployments to improve the overall geometry and SINR levels, particularly for cell edge users. However this gain in SINR is typically at a cost of a decrease in overall aggregate cell throughput and spectral efficiency. For example, overall throughput is reduced to about 70% of an N=1 deployment if N=⅓ FFR is employed.

Use of pico-cell or relay node overlays on existing macro cellular deployments can also be employed to improve cell coverage as well as increase cell edge or overall cell throughput. However macro/pico-cell heterogeneous deployments suffer from a number of potential problems. In LTE Release 8, cell selection between macro-cell base stations and pico-cell base stations will typically be based on use of reference symbol received power (RSRP). With such an approach, macro-cell UEs near the macro cell edge will typically be transmitting with high power and can cause a high level of interference to nearby pico-cell base stations. On the downlink (DL) if the UE has open access to either the macro or pico base stations, the UE can connect to the best link. However, at the border between the macro and pico cells the signal-to-interference (SIR) level can be low. In such a situation, inter-cell interference-coordination approaches can be beneficial. However if access to the pico or femto-cells of the heterogeneous network is restricted or closed (e.g., closed subscriber groups or CSGs), the femtocell base stations can cause a high level of interference to nearby macro UEs that cannot handover to the femto base stations.

A second possible approach for cell selection between macro and pico base stations is to employ a path gain approach which is optimal for load balancing. With such an approach the UL signal strength will generally be robust, however the SIR at the macro-pico cell borders may be low. With respect to the DL, high interference may be experienced by the pico UEs from the macro base station transmissions for both the control and data channels. Furthermore, for a CSG scenario, macro UEs close to the pico base station can only connect to the macro base station and will be a source of high interference to the pico base station for UL transmissions.

SUMMARY

In one of its aspects the technology disclosed herein concerns various example embodiments of base station nodes, e.g., base stations, of a heterogeneous radio access network. The heterogeneous radio access network comprises a macro layer (which includes at least one macro cell served by a macro base station) and a micro layer (which includes at least one micro cell served by a micro base station). Some example embodiments of base station nodes are macro base stations serving macro cells; other example embodiments of base station nodes are micro base stations serving micro cells.

In an example embodiment the base station comprises a terminal locator and a scheduler. The terminal locator is configured to obtain an indication of location of a wireless terminal in a cell served by the base station. For example, the terminal location may determine whether the wireless terminal is in a center region or an edge region of the cell served by the base station node.

The scheduler is configured to use the indication of location to assign to the wireless terminal a frequency of the frequency bandwidth usable by the heterogeneous radio access network. The scheduler, known as a location-influenced partitioning scheduler, is particularly configured to assign a frequency from a partitioned portion of the frequency bandwidth if the cell served by the base station node is a micro cell and the wireless terminal is in an edge region of a micro cell. The scheduler is also configured to assign a frequency of the frequency bandwidth if the cell served by the base station node is a micro cell and the wireless terminal is in a center portion of the micro cell. The frequency assignment to a wireless terminal that is in a center portion of a cell may be by different criteria than that of a wireless terminal in an edge portion of the cell. For example, the micro base station may assign a frequency of the frequency bandwidth without regard to the partitioned portion (e.g., at any suitable frequency in the frequency bandwidth without constraint of the partitioned portion) if the wireless terminal is in a center portion of the micro cell.

In an example embodiment, if the cell served by the base station node is a macro cell the scheduler is further configured to assign a frequency of the frequency bandwidth if the wireless terminal is served by the macro cell and is in a center portion of the macro cell or does not substantially interfere with a micro cell. The frequency assignment to a wireless terminal that is in a center portion of a cell may be by different criteria than that of a wireless terminal in an edge portion of the cell. For example, the scheduler may be further configured to assign a frequency of the frequency bandwidth without regard to the partitioned portion if the wireless terminal is served by the macro cell and is in a center portion of the macro cell or does not substantially interfere with a micro cell.

As used herein, a "partitioned portion" is less than the entire frequency bandwidth usable by the heterogeneous radio access network. Typically the frequency bandwidth used by the heterogeneous radio access network is divided into plural partitions, e.g., at least a first partition and a second partition. Thus, a partitioned portion may be a subset of the frequency bandwidth usable by the heterogeneous radio access network, and may comprise one of plural partitions of the frequency bandwidth. Being assigned a frequency from a partitioned portion means that a wireless terminal is not eligible to have a frequency assignment from all frequencies of the bandwidth usable by the heterogeneous radio access network.

As mentioned above, in some example embodiments the base station nodes are micro base stations serving micro cells. In such example embodiments, the heterogeneous radio access network comprises plural macro cells and plural micro cells within each of the plural macro cells, and the frequency bandwidth used by the heterogeneous radio access network is divided into plural partitions.

In some example embodiments of micro base station nodes the scheduler is configured to assign a frequency from the second partition if the wireless terminal is in an edge region of a micro cell served by the micro base station node.

In some example embodiments of micro base station nodes selected one of the plural partitions is a different partition than that which is used by a micro base station node within the macro cell to assign a frequency to any wireless terminal within the micro base station node. In an example implementation the selected one of the plural partitions is a same partition that is used by a micro base station node within another macro cell to assign a frequency to a wireless terminal in an edge region of the micro base station node which is in the another macro cell.

In some example embodiments of micro base station nodes the scheduler is further configured to assign the frequency from a selected one of plural partitions of the frequency bandwidth, the selected one of the plural partitions being a same partition which is used, by another base station node serving another micro cell in a same macro cell, to assign a frequency to another wireless terminal in an edge region of the another micro cell, but the selected one of the plural partitions being different from another partition which is used, by yet another base station node serving another micro cell in another macro cell which is adjacent to the macro cell, to assign a frequency to yet another wireless terminal in an edge region of the yet another micro cell.

In some example embodiments of micro base station nodes the scheduler is further configured to assign the frequency from a selected one of plural partitions of the frequency bandwidth, the selected one of the plural partitions being a different partition than that which is used, by another base station node serving another micro cell in a same macro cell, to assign a frequency to another wireless terminal in an edge region of the another micro cell.

In some example embodiments of micro base station nodes the plural partitions are divided into plural sub-partitions. A first partition is associated with the plural macro cells and a second partition is associated with the plural micro cells. A first sub-partition of the second partition is primarily for micro cells in a first macro cell and a second sub-partition of the second partition is primarily for micro cells in a second macro cell. Alternatively the first sub-partition of the second partition may be primarily for a first micro cell in the first macro cell and the second sub-partition may be for a second micro cell (or other micro cells) in the first macro cell. The base station node serves a particular micro cell comprising the plural micro cells. The scheduler is further configured to assign to the wireless terminal a frequency selected from a selected sub-partition of the second partition if the wireless terminal is in an edge region of the particular micro cell. In an example implementation, the selected sub-partition of the second partition is associated with the macro cell in which the particular micro cell is located.

In some example embodiments the base station nodes are macro base stations serving macro cells. In such example embodiments, the heterogeneous radio access network comprises plural macro cells and plural micro cells within each of the plural macro cells, and the frequency bandwidth used by the heterogeneous radio access network is divided into plural partitions.

The scheduler is configured to assign a frequency of the frequency bandwidth if the wireless terminal is in a center portion of the cell served by the base station node or does not substantially interfere with a micro cell. The frequency assignment to a wireless terminal that is in a center portion of a cell may be by different criteria than that of a wireless terminal in an edge portion of the cell. For example, in some example embodiments of macro base station nodes, the scheduler is configured to assign a frequency of the frequency bandwidth without regard to the partitioned portion if the wireless terminal is in a center portion of the cell served by the base station node or does not substantially interfere with a micro cell.

In some example embodiments of micro base station nodes the scheduler is configured to assign a frequency from a first partition if the wireless terminal is in an edge region of a macro cell served by the macro base station node.

In some example embodiments of micro base station nodes the scheduler is further configured to assign a frequency from the a selected one of plural partitions of the frequency bandwidth if the wireless terminal is in an edge region of the cell served by the macro base station node, the selected one of the plural partitions being a different partition than that which is used by another base station node serving an adjacent macro cell to assign a frequency to another wireless terminal in an edge region of the adjacent macro cell. In an example implementation, the selected one of the plural partitions is a different partition than that which is used by a micro base station node within the macro cell to assign a frequency to any wireless terminal within the micro base station node. In another example implementation, the selected one of the plural partitions is a same partition that is used by a micro base station node within another macro cell to assign a frequency to a wireless terminal in an edge region of the micro base station node which is in the other macro cell.

Some example embodiments of micro base station nodes, are two stage embodiments. In the two stage embodiments the plural partitions are divided into plural sub-partitions. A first partition is associated with one or more macro cells and a second partition is primarily associated with the plural micro cells. The macro base station node serves a particular macro cell comprising the plural macro cells.

In an example two stage embodiment of a macro base station the scheduler is further configured to assign to the wireless terminal a frequency of a selected one of the sub-partitions of the first partition if the wireless terminal is in an edge region of the particular macro cell and/or substantially interferes with a cell other than the particular macro cell. In an example implementation, the selected one of the sub-partitions of the first partition is a sub-partition associated with the particular macro cell.

In another example two stage embodiment of a macro base station a first partition is associated with the plural macro cells and a second partition is primarily associated with the plural micro cells. The base station node serves a particular macro cell comprising the plural macro cells. The scheduler is further configured to assign to the wireless terminal a frequency of the frequency bandwidth usable by the heterogeneous radio access network if the wireless terminal does not substantially interfere with a cell other than the particular macro cell. For example, the scheduler 36 may assign to the wireless terminal a frequency of the frequency bandwidth by different criteria, e.g., without regard to the partitioned portion.

In another example two stage embodiment of a macro base station a first partition is associated with the plural macro cells and a second partition is associated with the plural micro cells. The base station node serves a particular macro cell comprising the plural macro cells. The scheduler is further configured to assign to the wireless terminal a frequency of the second partition if the wireless terminal substantially interferes with a macro cell other than the particular macro cell and does not substantially interfere with a micro cell. In an example implementation, the scheduler is further configured to assign to the wireless terminal a frequency of a selected one of the sub-partitions of the second partition, and wherein the selected one of the sub-partitions of the second partition is associated with the particular macro cell.

In another of its aspects the technology disclosed herein concerns a method of operating a heterogeneous radio access network. The heterogeneous radio access network comprises a macro layer including at least one macro cell served by a macro base station and a micro layer comprising at least one micro cell served by a micro base station. In an example embodiment and mode the method comprises dividing a frequency bandwidth usable by the heterogeneous radio access network into a partitioned portion which is less than the entire bandwidth. The method further comprises assigning a frequency of the partitioned portion to a wireless terminal in an edge region of the micro cell; and assigning a frequency of the frequency bandwidth to a wireless terminal which is in a center region of the micro cell. The frequency assignment to a wireless terminal is in a center portion of a cell may be by different criteria than that of a wireless terminal in an edge portion of the cell. For example, the micro base station may assign a frequency of the frequency bandwidth without regard to the partitioned portion (e.g., at any suitable frequency in the frequency bandwidth without constraint of the partitioned portion) if the wireless terminal is in a center portion of the micro cell.

In an example embodiment and mode the method further comprises assigning, e.g., by different criteria (e.g., without regard to the partitioned portion), a frequency of the frequency bandwidth to a wireless terminal which is in a center region of the macro cell.

In an example embodiment and mode the method further comprises determining whether the wireless terminal is in the center region or the edge region for the micro cell.

In an example embodiment and mode the method further comprises dividing the frequency bandwidth usable by the heterogeneous radio access network into plural partitioned portions (each of which is less than the entire bandwidth), and assigning frequencies from the partitioned portions to wireless terminals in an edge region of the macro cell and wireless terminals in an edge region of the micro cell.

In an example implementation, the method further comprises: dividing the frequency bandwidth usable by the heterogeneous radio access network into plural partitions; assigning a frequency from a first partition to wireless terminals in an edge region of the macro cell; and, assigning a frequency from a second partition to wireless terminals in a edge region of the micro cell.

In an example embodiment and mode, the method further comprises: dividing the frequency bandwidth usable by the heterogeneous radio access network into plural partitions; assigning a frequency from a first partition to wireless terminals in the edge region of a first macro cell; assigning a frequency from a second partition to a wireless terminal in the edge region of a second macro cell; and, assigning a frequency from a third partition to a wireless terminal in the edge region of a micro cell.

In an example implementation the method further comprises assigning the frequency from the third partition to the wireless terminal in the edge region of a micro cell regardless of whether the micro cell is in the first macro cell or the second macro cell.

In an example embodiment and mode the method further comprises: dividing the frequency bandwidth usable by the heterogeneous radio access network into plural partitions; assigning a frequency from a first partition to a wireless terminal in an edge region of a first macro cell; assigning a frequency from a second partition to a wireless terminal in an edge region of a second macro cell; assigning a frequency from a third partition to a wireless terminal in an edge region of a first micro cell within the first macro cell; and, assigning a frequency from a fourth partition to a wireless terminal in an edge region of a second micro cell within the first macro cell.

In an example embodiment and mode, the method further comprises: assigning a frequency from the third partition to a wireless terminal in an edge region of a first micro cell within the second macro cell; and assigning a frequency from the fourth partition to a wireless terminal in an edge region of a second micro cell within the second macro cell.

In an example embodiment and mode the method further comprises: dividing the frequency bandwidth usable by the heterogeneous radio access network into plural partitions; assigning a frequency of a first partition to wireless terminals in an edge region of the plural micro cells within a first macro cell; and assigning a frequency of a second partition to wireless terminals in an edge region of the plural micro cells within a second macro cell.

In an example implementation, the method further comprises assigning a frequency of the frequency bandwidth to a wireless terminal which is in any of the plural macro cells or in the center region of any of the plural micro cells. Such assignment may be without regard to the plural partitioned portion.

In an example embodiment and mode the method further comprises: dividing the frequency bandwidth usable by the heterogeneous radio access network into plural partitions; assigning a frequency of a first partition to a wireless terminal in an edge region of a first micro cell within a first macro cell; and, assigning a frequency of a second partition to a wireless terminal in an edge region of a second micro cell within the first macro cell.

In an example embodiment and mode, the method further comprises: assigning a frequency of the first partition to a wireless terminal in an edge region of a first micro cell within a second macro cell; and, assigning a frequency of the second partition to a wireless terminal in an edge region of a second micro cell within the second macro cell.

Some example embodiments and modes involve multiple (e.g., two) stages of partitioning. In an example embodiment and mode the method further comprises: dividing the frequency bandwidth usable by the heterogeneous radio access network into plural partitions including a first partition and a second partition; dividing the plural partitions into plural sub-partitions; assigning a frequency of a second partition to a wireless terminal in an edge region of one of the plural micro cells by: assigning a frequency of a first sub-partition of the second partition if the wireless terminal is in an edge region of a micro cell in the first macro cell; and assigning a frequency of a second sub-partition of the second partition if the wireless terminal is in an edge region of a micro cell in the second macro cell.

In an example embodiment and mode the method further comprises assigning a frequency of a first partition to a wireless terminal in an edge region of one of the plural macro cells by: assigning a frequency of a first sub-partition of the first partition if the wireless terminal is in an edge region of a first macro cell; and assigning a frequency of a second sub-partition of the first partition if the wireless terminal is in an edge region of a second macro cell.

In an example embodiment and mode the method further comprises assigning a frequency of a first partition to a wireless terminal in one of the plural macro cells by: assigning a frequency of a first sub-partition of the first partition if the wireless terminal is in an edge region of a first macro cell and interferes with any micro base station node; and assigning a frequency of a second sub-partition of the first partition if the wireless terminal is in a second macro cell and interferes with any micro base station node.

In an example embodiment and mode the method further comprises: assigning a frequency of the second partition to a wireless terminal in one of the plural macro cells if the wireless terminal is in a macro cell and does not substantially interfere with any micro base station node.

In an example embodiment and mode the method further comprises assigning a frequency of to the wireless terminal in one of the plural macro cells by: assigning a frequency of a first sub-partition of the second partition if the wireless terminal is in an edge region of a first macro cell and does not substantially interfere with any micro base station node; and assigning a frequency of a second sub-partition of the second partition if the wireless terminal is in a second macro cell and does not substantially interfere with any micro base station node.

In an example embodiment and mode the frequency bandwidth the first sub-partition of the first partition is separated from the first sub-partition of the second partition by at least the second sub-partition of the first partition.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

Figure 7:
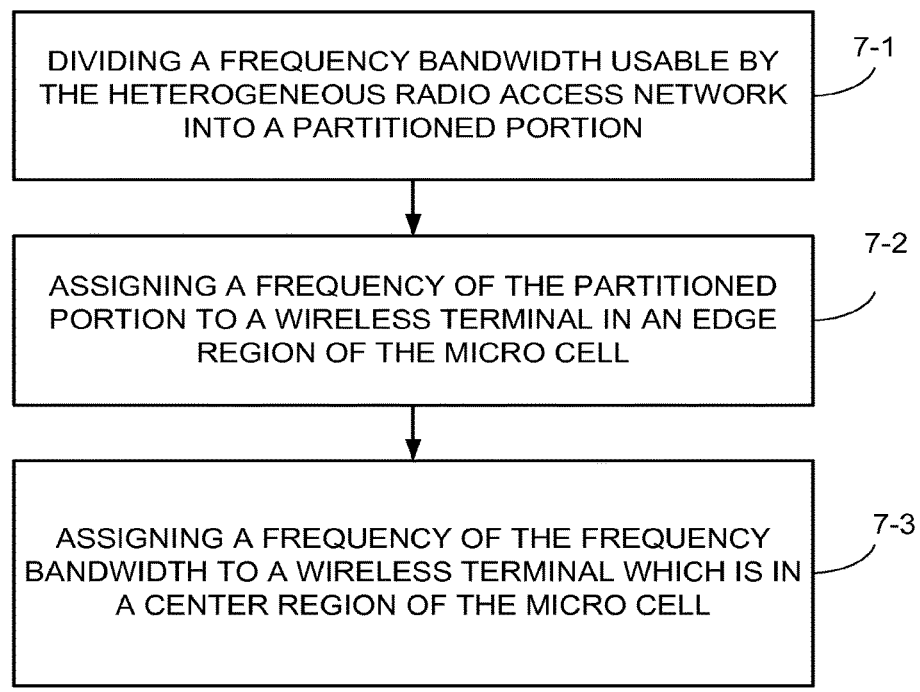
FIG. 7 is a flowchart illustrating representative, basic acts or steps performed in a generic mode of an example method of the technology disclosed herein.

7A is a flowchart illustrating representative, basic acts or steps performed in a modified mode of the basic method of FIG. 7.

Figure 7A:
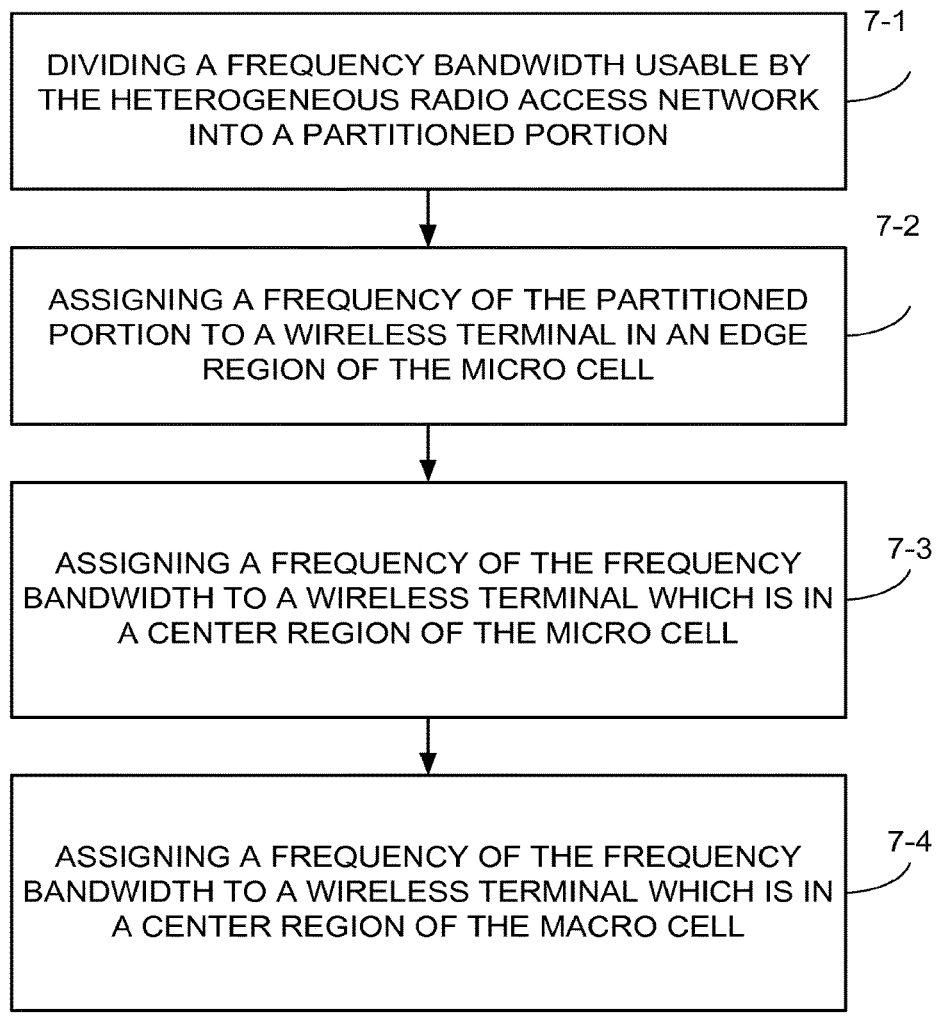
Figure 7B:
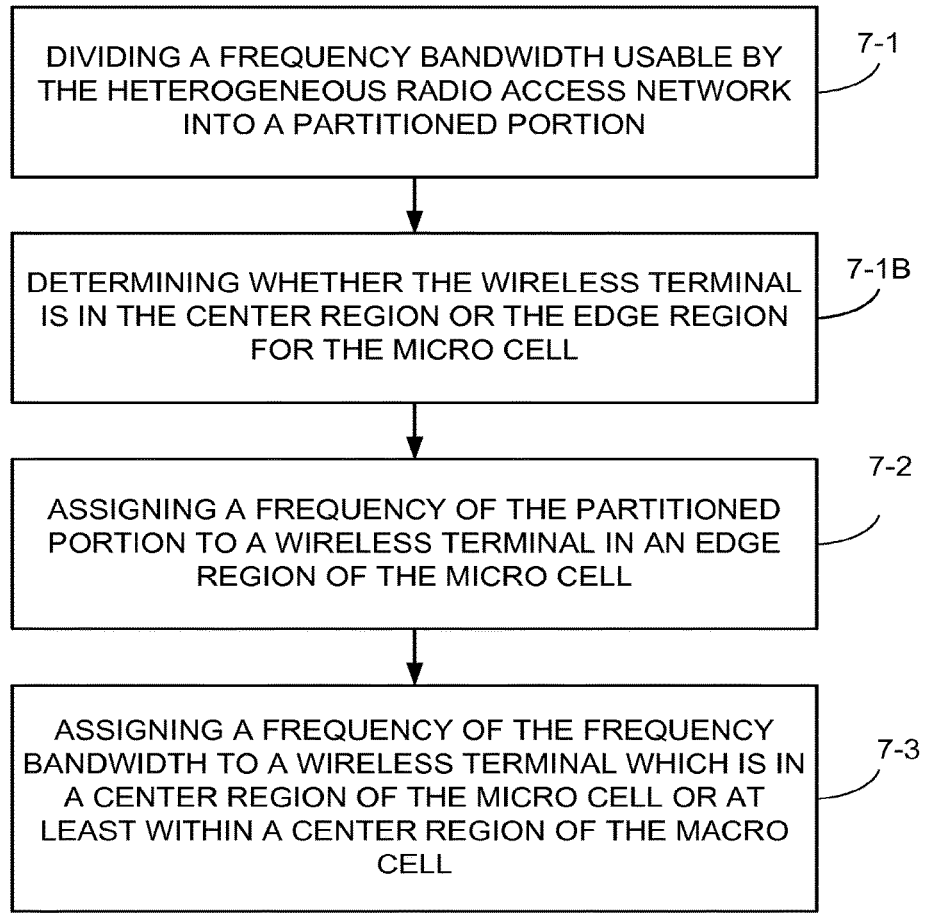

FIG. 7B is a flowchart illustrating representative, basic acts or steps performed in a more detailed mode of the basic method of FIG. 7.

Figure 7C:
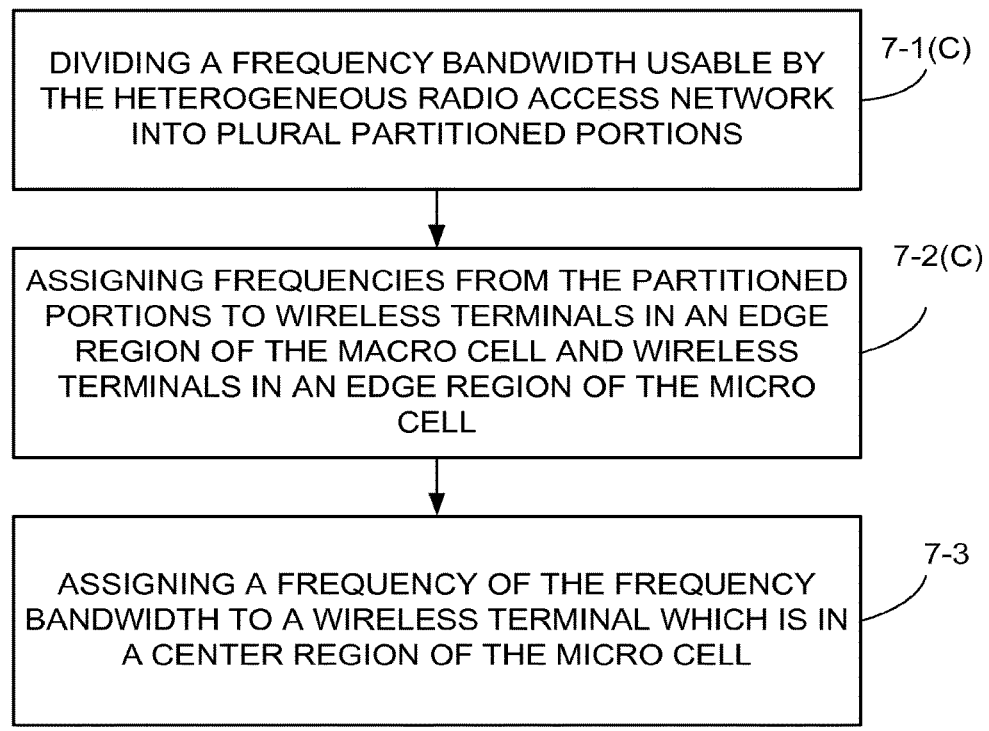

FIG. 7C is a flowchart illustrating representative, basic acts or steps performed in another more detailed mode of the basic method of FIG. 7.

Figure 8:
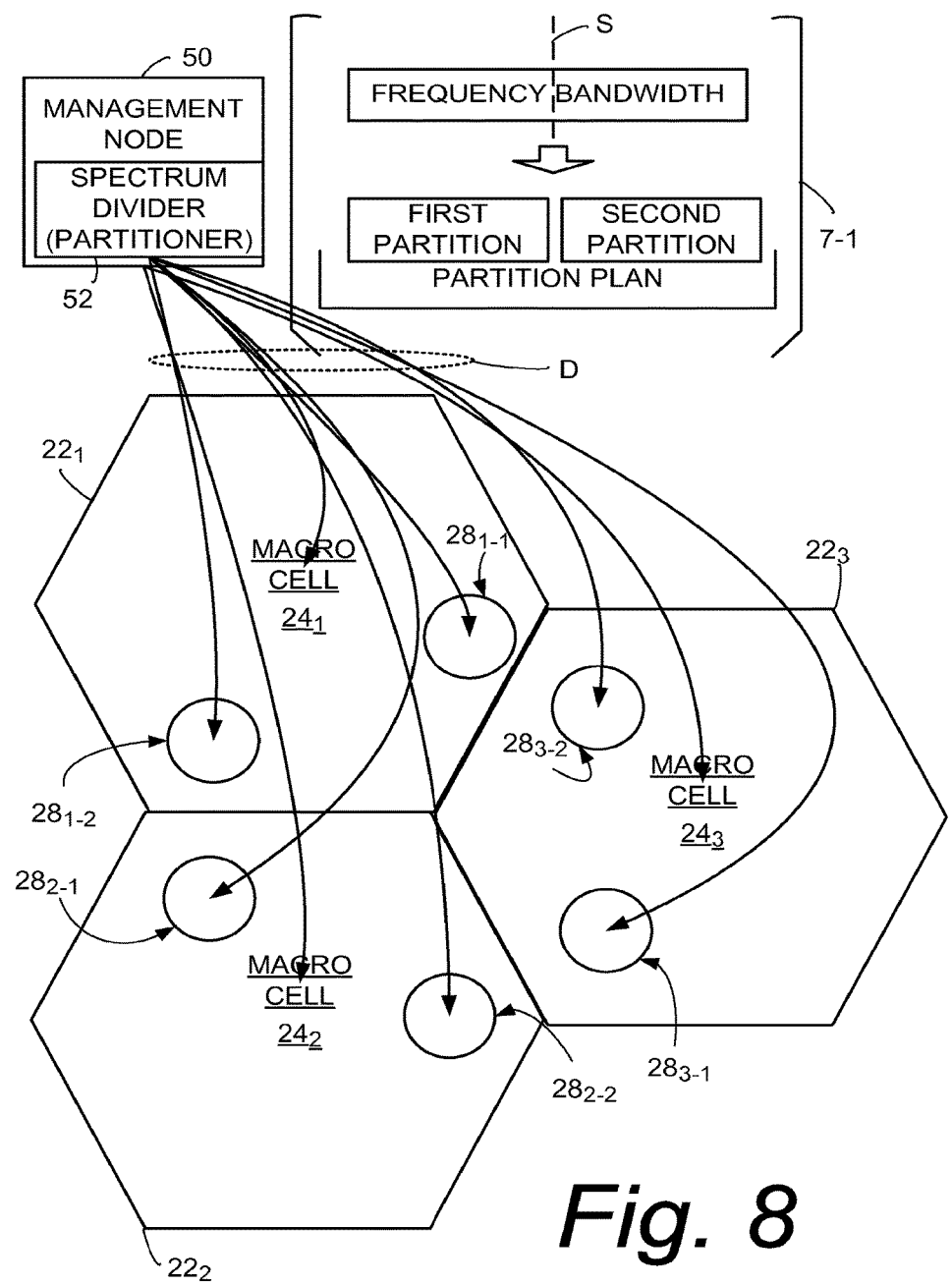

FIG. 8 is a diagrammatic view depicting downloading of a partition plan from a central or management node to base station nodes of a heterogeneous radio access network.

Figure 9:
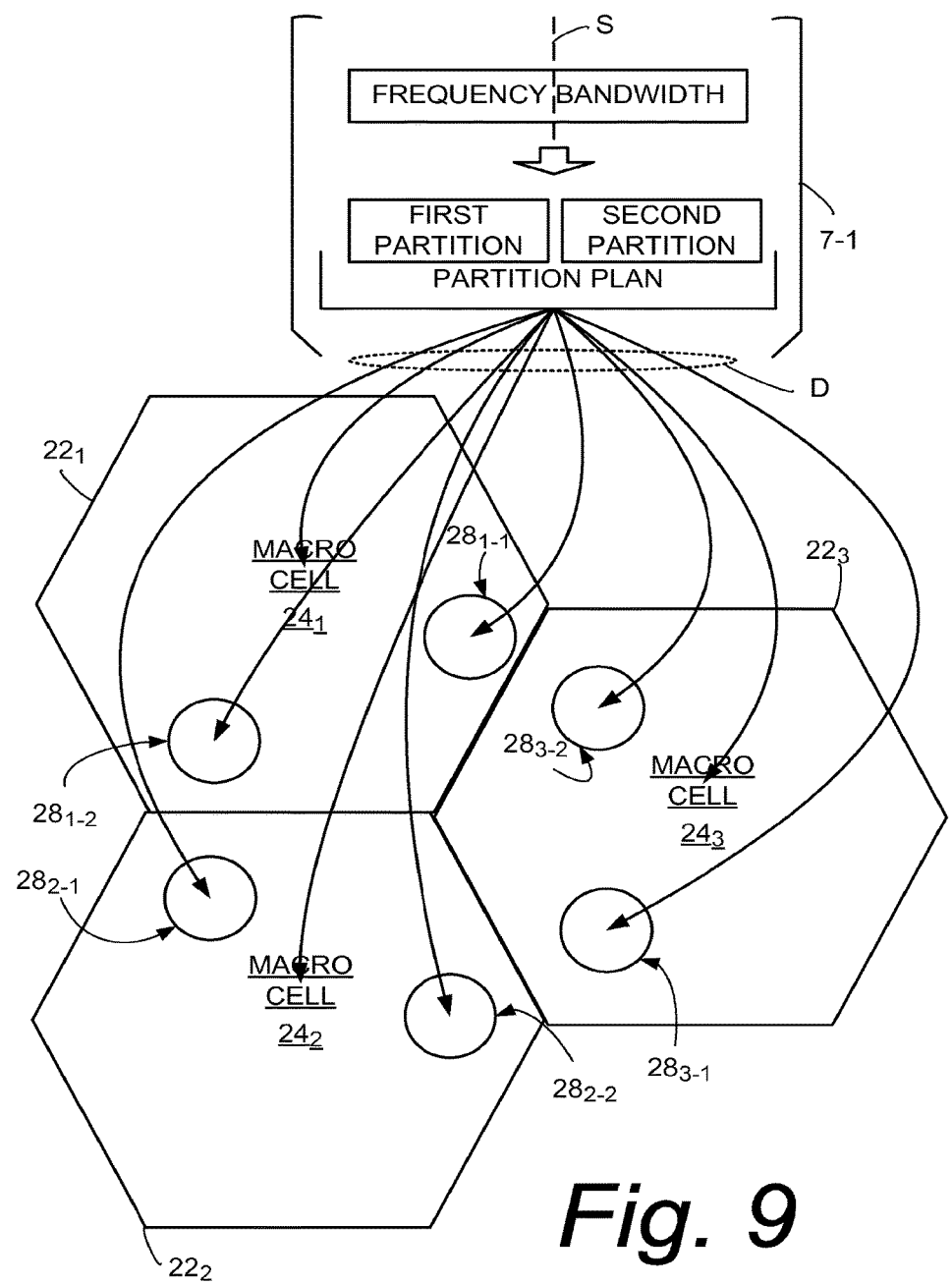

FIG. 9 is a diagrammatic view depicting loading of a partition plan into base station nodes of a heterogeneous radio access network.

FIG. 10A, FIG. 11A, FIG. 12A, FIG. 13A, FIG. 14A are diagrammatic views illustrating example embodiments and modes of a resource allocation strategies according to the technology disclosed herein.

FIG. 10B, FIG. 11B, FIG. 12B, FIG. 13B, and FIG. 14B are flowcharts illustrating representative, basic acts or steps performed in methods of operating a heterogeneous radio access network in accordance with the respective strategies of FIG. 10A, FIG. 11A, FIG. 12A, FIG. 13A, and FIG. 14.

FIG. 11C, FIG. 12C, FIG. 13C, and FIG. 14C are flowcharts illustrating representative, basic acts or steps performed in alternate methods of operating a heterogeneous radio access network in accordance with the respective strategies of FIG. 11A, FIG. 12A, FIG. 13A, and FIG. 14A.

FIG. 15 is a diagrammatic view illustrating an example embodiment and mode of a sub-partitioning resource allocation strategy according to the technology disclosed herein.

Figure 15A:
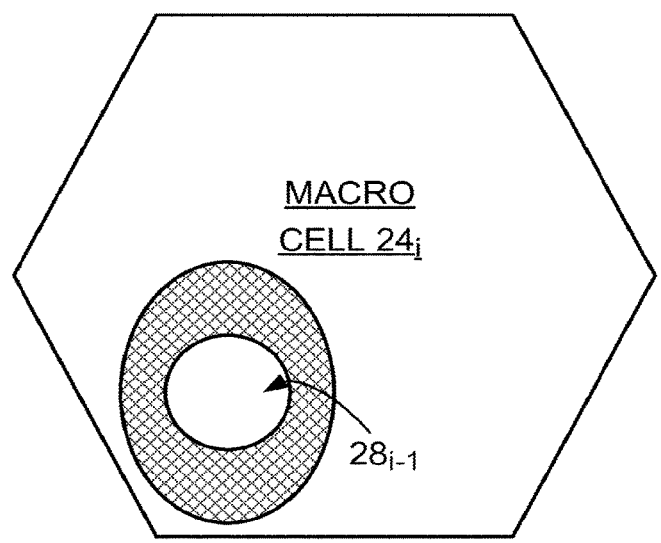

FIG. 15A is a diagrammatic view of portions of a heterogeneous radio access network showing a hatched region wherein macro wireless terminals of a macro base station potentially strongly interfere with a micro cell.

Figure 16:
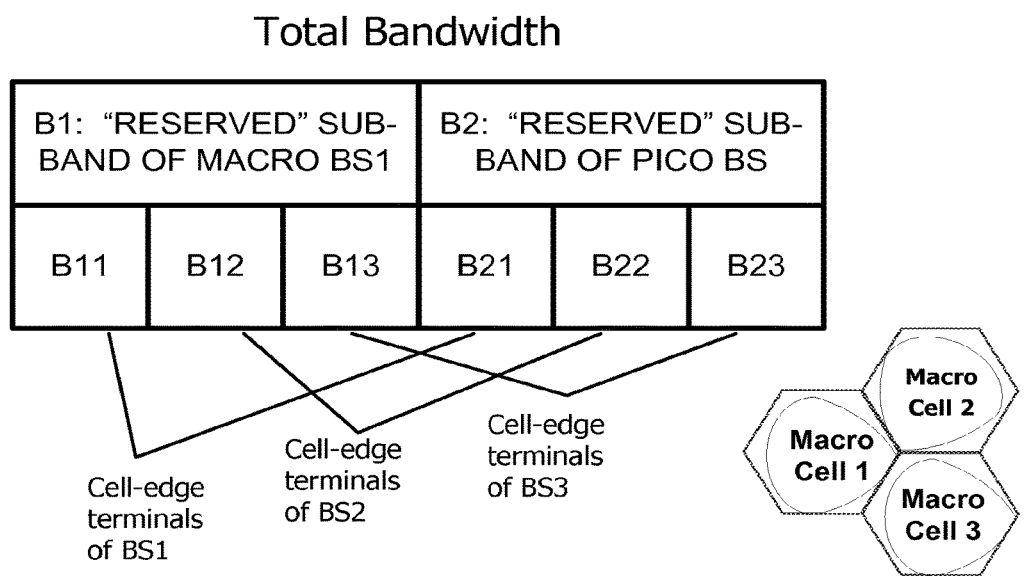

FIG. 16 is a diagrammatic view illustrating another example embodiment and mode of a sub-partitioning resource allocation strategy according to the technology disclosed herein.

Figure 16A:
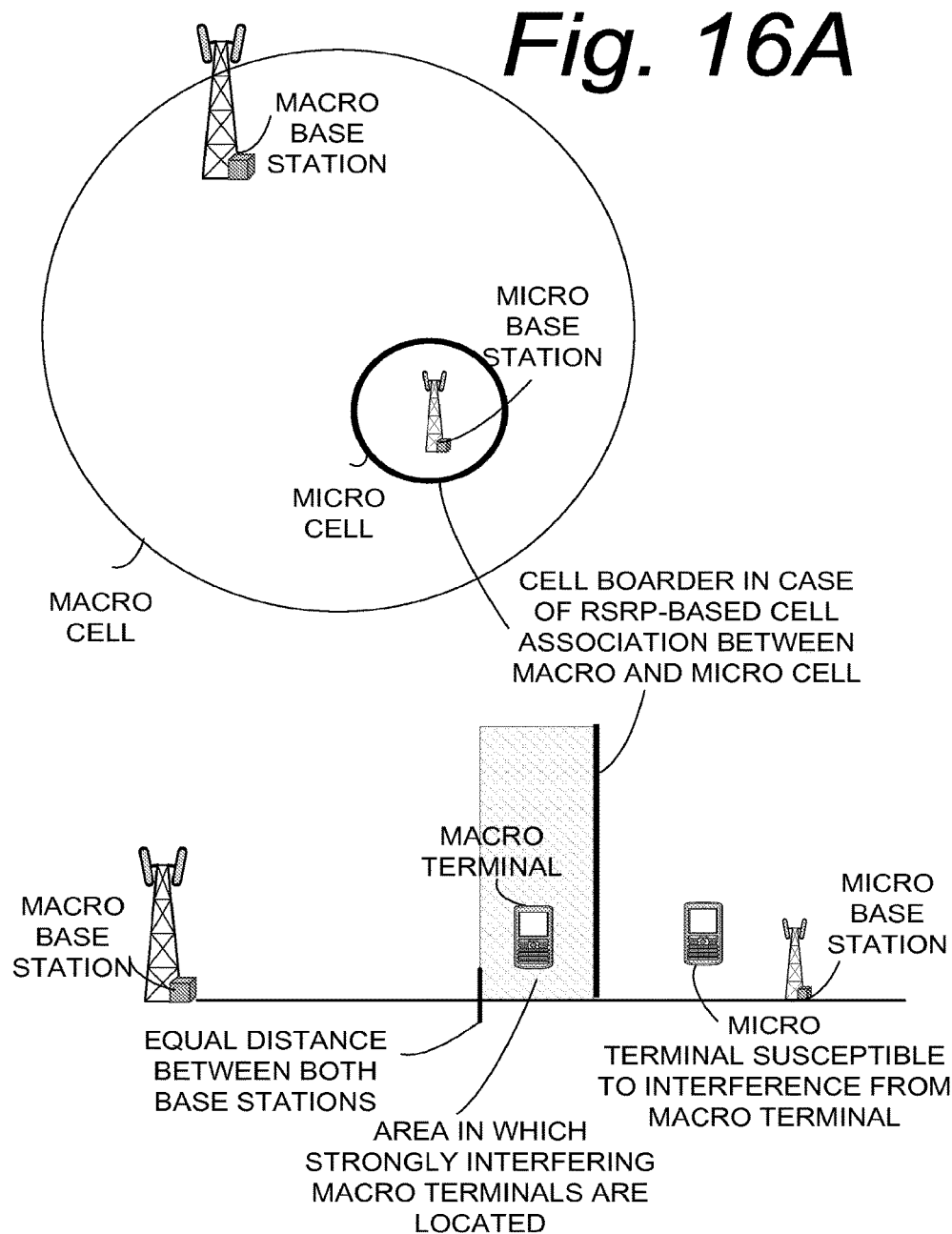

FIG. 16A is a diagrammatic view further illustrating the embodiment of FIG. 16.

FIG. 17 and FIG. 17A-FIG. 17D are flowcharts illustrating representative, basic acts or steps performed in methods of operating a heterogeneous radio access network in accordance with various sub-partitioned embodiments and/or modes.

Figure 18:
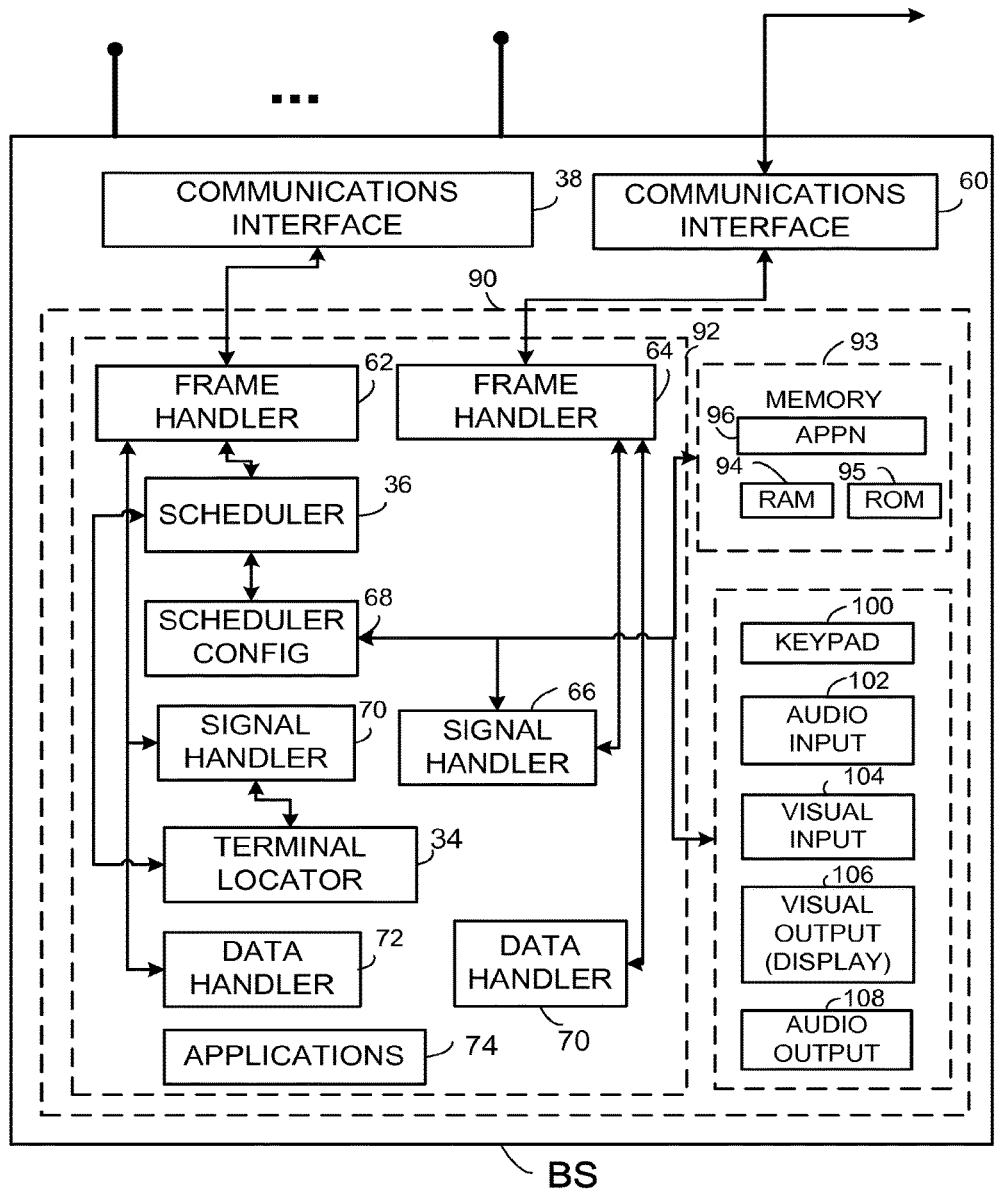

FIG. 18 a diagrammatic view of portions of another example embodiment of a base station node, including a platform implementation.

Figure 19:
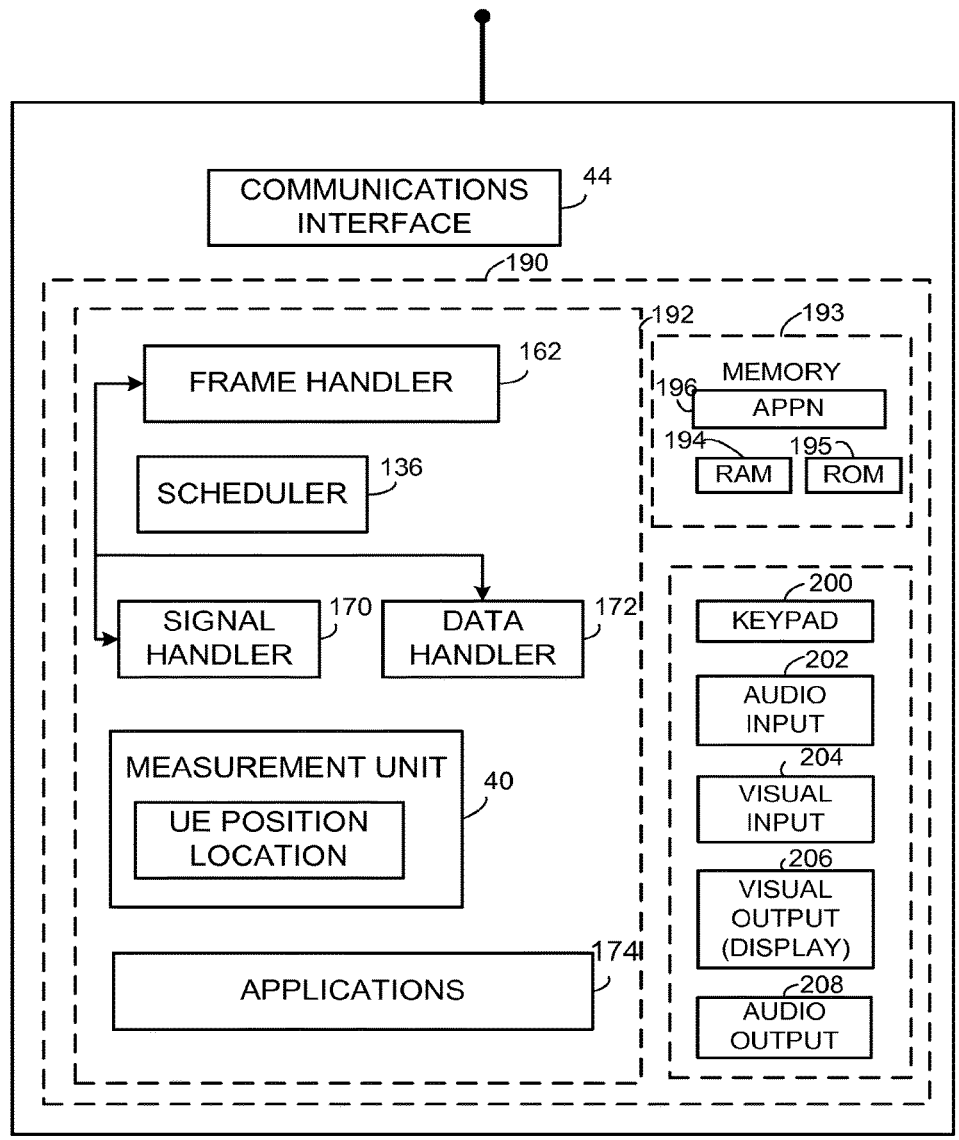

FIG. 19 a diagrammatic view of portions of another example embodiment of a wireless terminal, including a platform implementation.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 1:
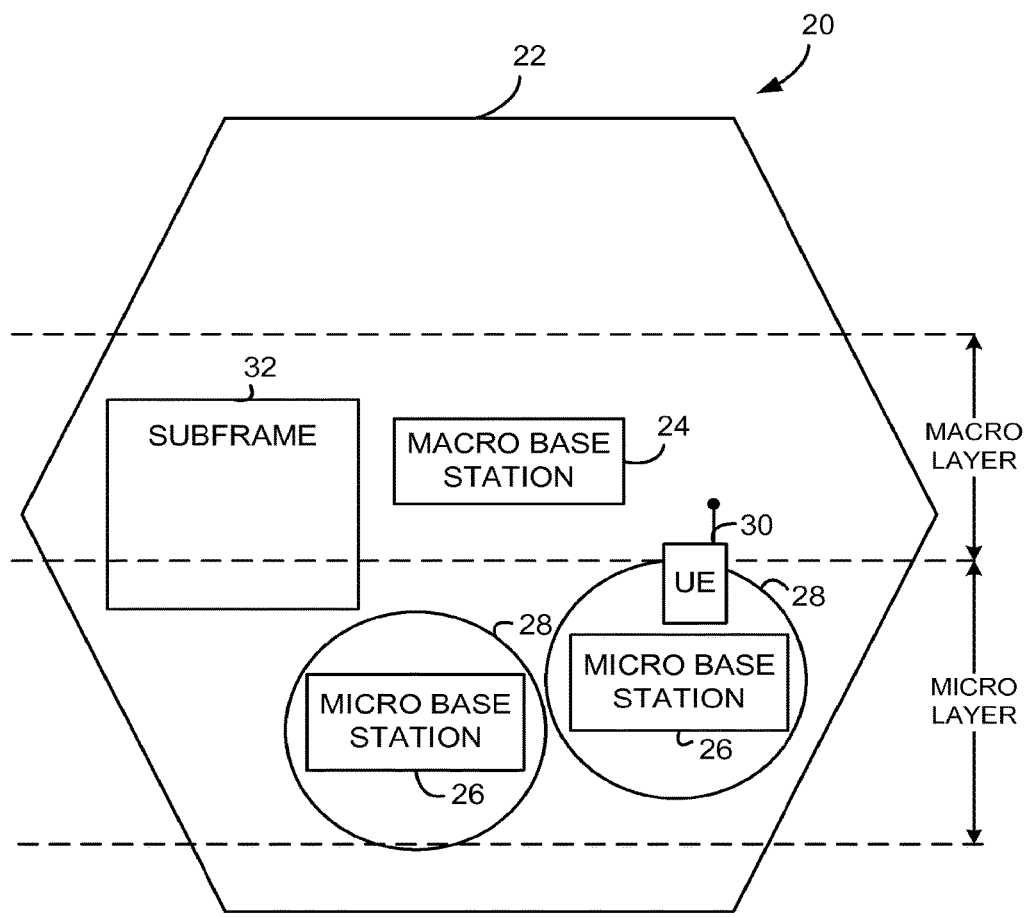
FIG. 1 is a diagrammatic view of portions of a heterogeneous radio access network which is simplified to illustrate a macro layer and a micro layer.

FIG. 1 shows portions of a heterogeneous radio access network 20, and particularly macro cell 22 which is served by macro base station 24. One or more micro base stations 26 are situated within or proximate macro cell 22. Each micro base station serves a corresponding micro cell 28. The macro and micro base stations communicate over an air or radio interface with one or more wireless terminals, also known as user equipment units (UEs). One such representative wireless terminal (UE) 30 is shown and arbitrarily positioned in FIG. 1.

Figure 2:
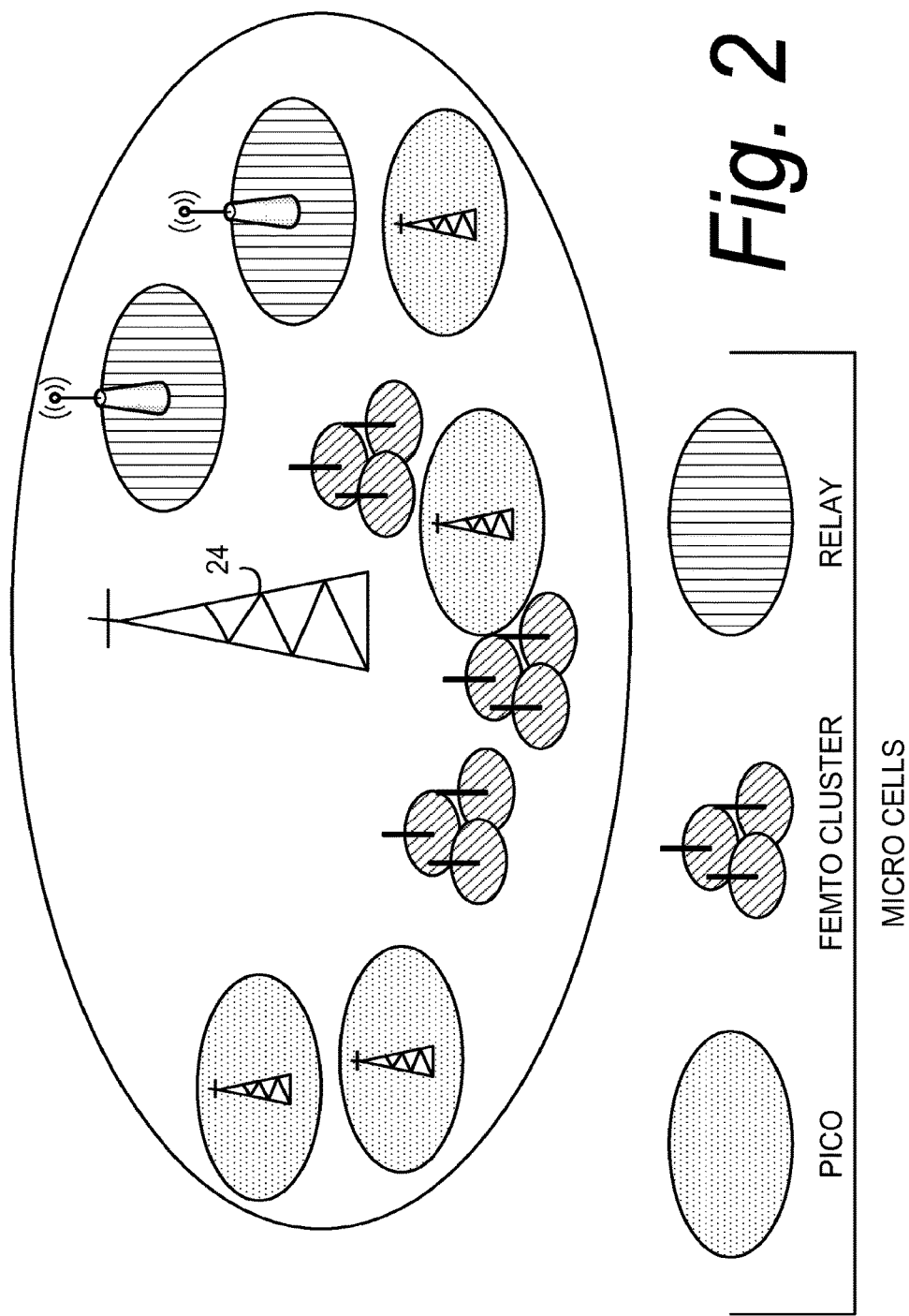
FIG. 2 is a diagrammatic view of portions of a heterogeneous radio access network showing, e.g., example placement of different types of base stations.

As used herein, the terminology "micro base station" is to be understood as broadly encompassing any type of station which operates over a radio or air interface on both downlink (DL) and uplink (UL) and has extent of transmission that is less than (e.g., in geographic range or power) or subordinate to (e.g., delegated from/by) a macro base station. In corresponding fashion the terminology "micro cell" refers to any cellular territory or coverage area served by such broadly defined micro base station. In other words, a macro base station has at least one of higher nominal transmit power and larger coverage area than a micro base station. Examples of types of cells and base stations encompassed by the terminology "micro cell" and "micro base station" are illustrated in FIG. 2 as including pico cells and pico base stations, femto cells (which can exist in a femto cluster) and femto base stations, and relay base stations. Macro base stations are typically separated by distances on the order of kilometers, and thus the radii of macro cells is also on the order of kilometers. On the other hand, micro base stations are typically separated by distances on the order of a few hundred meters (e.g., 100 m-200 m, and in some instances 500 m), and thus the radii of micro cells is also on the order of a few hundred meters.

As will subsequently become more fully appreciated, FIG. 1 and FIG. 2 show only one macro cell 22 of heterogeneous radio access network 20. Typically a heterogeneous radio access network comprises plural (e.g., scores of) macro cells. Further, in some heterogeneous radio access networks the operation of the macro base stations for the macro cells and micro base stations for the micro cells may be coordinated, particularly in a Coordinated Multipoint (CoMP) system. In CoMP architecture a collection of cells (e.g., sub-cells) may be connected to a central node that coordinates the transmission/reception of user signals to mitigate interference among the smaller sub-cells. CoMP architecture is understood with reference to, e.g., U.S. patent application Ser. No. 12/563,589, entitled "Inter-Cell Interference Mitigation", also published as United States Patent Publication US 2010/0261493, which is incorporated herein by reference in its entirety.

As mentioned previously, a "wireless terminal" such as wireless terminal (UE) 30 encompasses mobile stations or user equipment units (UE) such as mobile telephones ("cellular" telephones) and laptops with wireless capability, e.g., mobile termination, and thus can be, for example, portable, pocket, hand-held, computer-included, or car-mounted mobile devices which communicate voice and/or data with radio access network. In some example embodiments a wireless terminal need not be mobile but can instead be fixed.

Information is typically transmitted over the air interface between base stations and wireless terminal in frames. In fact, in some radio access technologies a frame typically comprises plural subframes, with each of the subframes being formatted similarly and in a manner understood by both the base station and the wireless terminals. The frames and subframes are formatted so that the macro and micro base stations, on the one hand, and the wireless terminals 30, on the other hand, know what type of information to expect in different portions of fields of the frame/subframe. In some radio access technologies, a subframe is conceptualized as comprising a two dimensional array or "resource grid" of resource elements (RE), the resource elements being arranged in symbol order along a first (horizontal) direction (defined, e.g., by time [time division]) and according to frequency subcarrier along a second (vertical) direction (defined, e.g., by frequency [frequency division]). With respect to the first or direction the symbols may be grouped into slots, e.g., six or seven symbols may comprise a slot of the subframe, with the subframe comprising plural (e.g., two) slots. At least some sets of resource elements of the subframe are generally allocated to serve as "channels", with some of the channels being used for transmission of control information while other channels are used for transmission of user data. Moreover, in some radio access technologies some channels of the subframe are allocated for transmission in a downlink (DL) [in a direction from a base station to a wireless terminal] while other channels of the subframe may be allocated for transmission in an uplink (e.g., in a direction from a wireless terminal to a base station).

In a manner to comprehend and encompass all the foregoing, FIG. 1 illustrates a transmission of subframe 32 over the air interface between a base station and a wireless terminal. The terminology "subframe" as herein utilized is to be understood as encompassing any unit of information of repetitive or pre-defined format, and therefore is to be understood as being applicable to, e.g., a frame as well as a subframe. In view of the heterogeneous nature of network 20 and the networks' inclusion of both macro and micro base stations, FIG. 1 further illustrates that radio transmissions in network 20 occur both at a macro layer and a micro layer. In particularly, macro base station 24 exchanges subframes with one or more wireless terminals in the macro layer, while the micro base stations 26 exchange subframes with one or more wireless terminals in the micro layer. The depiction in FIG. 1 of the stratification of the macro layer and the micro layer is simply for illustrating delineation of the two layers, and does not necessarily impose any geographical or territorial characteristics or restrictions with respect to either layer.

Figure 3:
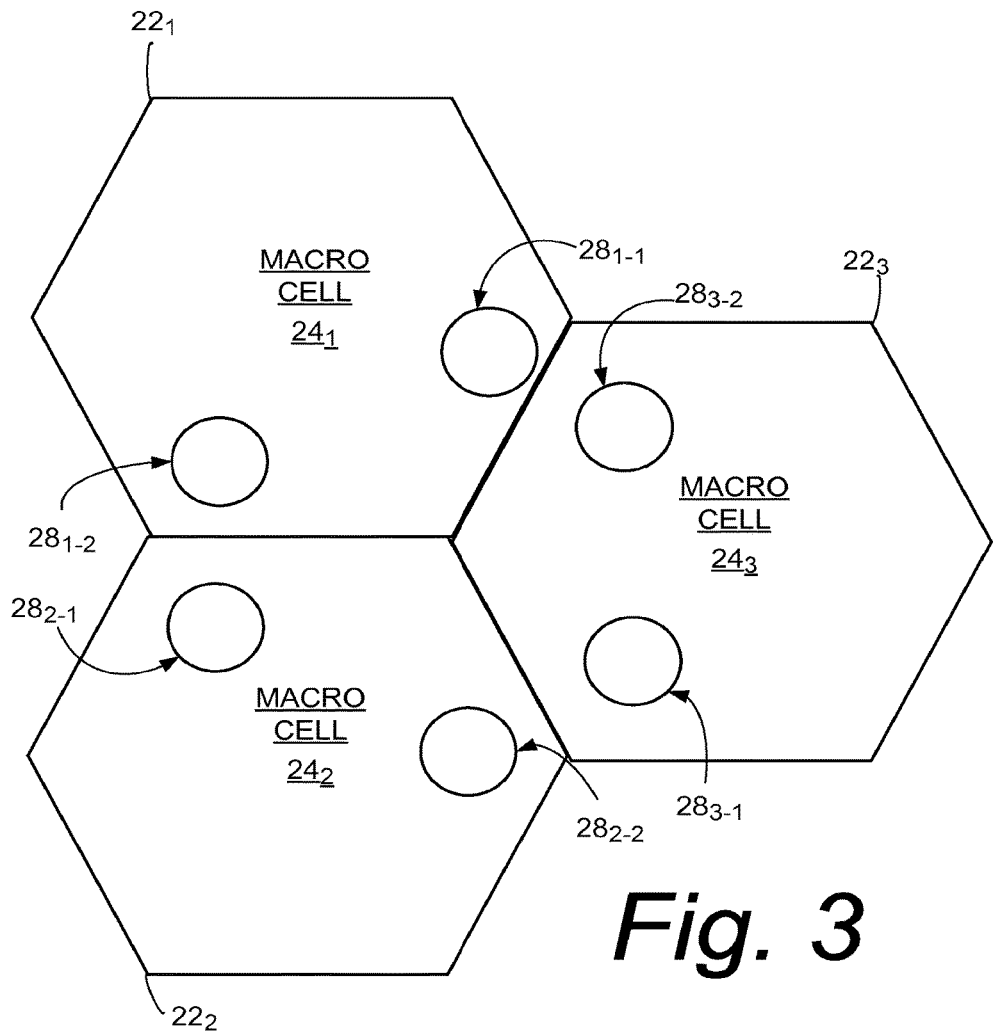
FIG. 3 is a diagrammatic view of portions of a heterogeneous radio access network showing comprising plural macro cells, each macro cell serving plural micro cells.

FIG. 3 shows an example heterogeneous radio access network 20 comprising plural macro cells, e.g., macro cell $22_1$ through macro cell $22_3$. Again it will be appreciated that a fewer or greater number of macro cells may be included in the heterogeneous radio access network 20. Each macro cell is served by a corresponding macro base station, so that macro base station $24_1$ through $24_3$ are shown for respective macro cell $22_1$ through macro cell $22_3$. FIG. 3 further illustrates that two micro cells are situated within each macro cell, e.g., micro cell $28_{1-1}$ and micro cell $28_{1-2}$ within macro cell $22_1$; micro cell $28_{2-1}$ and micro cell $28_{2-2}$ within macro cell $22_2$; and, micro cell $28_{3-1}$ and micro cell $28_{3-2}$ within macro cell $22_3$. The general layout of the example heterogeneous radio access network 20 of FIG. 3 serves as a basic template for illustrating various resource assignment strategies of the technology disclosed herein.

Further, it should be understood that the illustrations of FIG. 1, FIG. 2, and FIG. 3 with only two macro cells and two micro base stations and their respective locations within or near the macro cell is not limiting, since a macro cell could encompass one or more than two micro cells and such micro cells may be diversely and non-uniformly arranged from one macro cell to another, depending upon geographic utilization and traffic need and conditions.

In one of its aspects the technology disclosed herein concerns various example embodiments of base station nodes of a heterogeneous radio access network. Such base station nodes, also referred to as "base stations", are at times collectively and individually referred to in the drawings as "BS". As illustrated by FIG. 1, the heterogeneous radio access network 20 comprises a macro layer (which includes at least one macro cell served by a macro base station) and a micro layer (which includes at least one micro cell served by a micro base station). Some example embodiments of base station nodes described herein are macro base stations serving macro cells; other example embodiments of base station nodes described herein are micro base stations serving micro cells.

Figure 4:
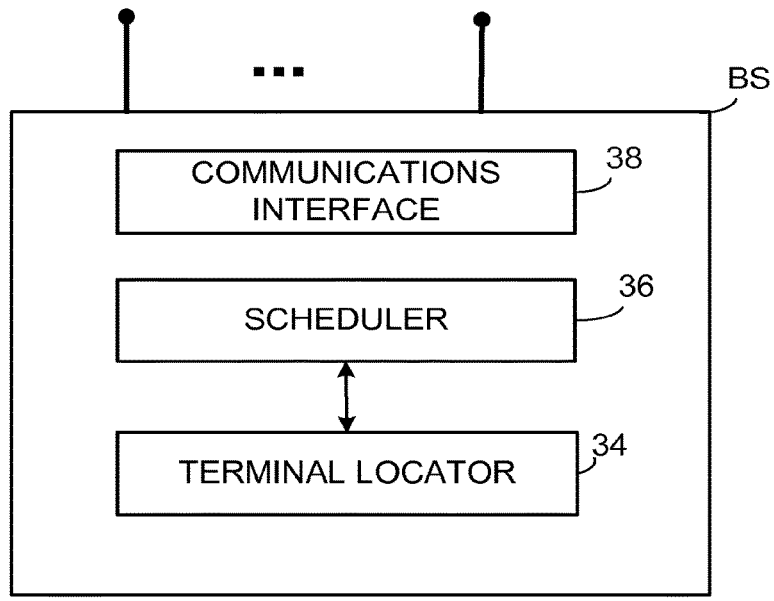
FIG. 4 a diagrammatic view of portions of an example embodiment of a generic base station node.

FIG. 4 shows an example embodiment of a generic base station node BS. The generic depiction of the base station BS in FIG. 4 is for illustrating certain features and functionalities of the base station without regard to whether the base station happens to be a macro base station serving a macro base station 24 or a micro base station 26 serving a micro cell 28. In other words, FIG. 4 shows units and functionalities that are both pertinent to the technology disclosed herein and common to both macro base stations and micro base stations encompassed hereby. In the example of FIG. 4, base station BS comprises terminal locator 34, scheduler 36, and communications interface 38. The base station BS typically includes other units and functionalities known to the person skilled in the art.

As explained herein, terminal locator 34 of base station BS obtains an indication of location of a wireless terminal 30 in a cell served by the base station. For example, the terminal location may determine whether the wireless terminal is in a center region or an edge region for the cell served by the base station node, as explained herein, e.g., with reference to FIG. 6.

The scheduler 36 of a base station BS has many functions, including assignment of resources (e.g., resources of a resource grid) for use in communication between the base station BS and the wireless terminals 30 which are served by the base station BS. The scheduler 36 typically assigns resources for use both on a downlink (DL) from the base station BS to a wireless terminal 30, as well as resources for use on the uplink (UL) from the wireless terminal (UE) 30 to the base station BS. Such resources may include or be described by one or more frequencies (e.g., subcarriers) and one or more time slots. As understood in the art, some of the resources may be assigned to or associated with particular channels. Various channels may have different names or purposes in accordance with different various conventions or standards. The various conventions or standards typically define messages in which grants of the allocated resources are communicated to the wireless terminals.

In accordance with the technology disclosed herein, scheduler 36 uses the indication of location (as determined by terminal locator 34) to assign, to the wireless terminal, a "frequency" of the frequency bandwidth usable by the heterogeneous radio access network. As illustrated by numerous embodiments herein described, scheduler 36 (also known as a location-conscious partitioned scheduler) is particularly configured to assign a frequency from a partitioned portion of the frequency bandwidth if the cell served by the base station node is a micro cell and the wireless terminal is in an edge region of a micro cell. The scheduler 36 is also configured to assign a frequency of the frequency bandwidth if the cell served by the base station node is a micro cell and the wireless terminal is in a center portion of the micro cell. The frequency assignment to a wireless terminal is in a center portion of a cell may be by different criteria than that of a wireless terminal in an edge portion of the cell. For example, the micro base station may assign a frequency of the frequency bandwidth without regard to the partitioned portion (e.g., at any suitable frequency in the frequency bandwidth without constraint of the partitioned portion) if the wireless terminal is in a center portion of the micro cell.

The partitioned portion of the frequency bandwidth to which a scheduler 36 assigns a wireless terminal is also herein known as the prioritized sub-band for the cell served by the base station to which the scheduler belongs. Therefore, by assigning cell-edge transceiver devices to its prioritized sub-band, a serving base station both protects them from interference and avoids causing too much interference to cell-edge transceiver devices of adjacent cells that assign their sensitive transceiver devices to the respective prioritized sub-bands as well.

The scheduler 36 is also configured to assign a frequency of the frequency bandwidth if the cell served by the base station node is a macro cell and the wireless terminal is at least in a center portion of the macro cell or does not substantially interfere with a micro cell. In some embodiments the scheduler 36 is configured to assign a frequency of the frequency bandwidth by different criteria than that used for an edge wireless terminal. For example, in some embodiments the scheduler 36 is configured to assign a frequency of the frequency bandwidth without regard to the partitioned portion if the cell served by the base station node is a macro cell and the wireless terminal is at least in a center portion of the macro cell or does not substantially interfere with a micro cell.

As used herein a "frequency" of the frequency bandwidth usable by the heterogeneous radio access network and assigned by scheduler 36 may be one or more frequency carriers (e.g., sub-carriers or sub-band) or other frequency resource(s) that utilize or are described with reference to a radio frequency spectrum. The singular term "frequency" is employed only for sake of simplification, it being understood that typically the "frequency" assigned refers to plural frequencies (e.g., subcarriers) which may or may not be consecutive frequencies in the frequency spectrum. Resource blocks comprised of several subcarriers (12 for LTE) do not have to be consecutively assigned. However, subcarriers within a resource block all have to be consecutively employed.

As used herein, a "partition" or "partitioned portion" is less than the entire frequency bandwidth usable by the heterogeneous radio access network. In accordance with the technology disclosed herein the frequency bandwidth used by the heterogeneous radio access network is typically divided into plural partitions, e.g., at least a first partition and a second partition. Thus, a partition or partitioned portion may be a subset (e.g., one or more frequencies or sub-carriers) of the frequency bandwidth usable by the heterogeneous radio access network, and may comprise one of plural partitions of the frequency bandwidth. Being assigned a frequency from a partitioned portion means that a wireless terminal is not eligible to have a frequency assignment from all frequencies of the bandwidth usable by the heterogeneous radio access network. Thus, in the context of the LTE standard, for example, a partition or "partitioned portion" may be a plurality of subcarriers or resource blocks. A frequency or a "sub-band" may be any continuous or discontinuous spectral portion having well-defined boundaries and being associated with one or more cells (or one or more BSs). Associations between sub-bands and cells or BSs may be statically determined or may alternatively be dynamically defined.

It should also be understood that the "frequency" assigned by scheduler 36 may be either for purposes of the downlink (DL) or the uplink (UL), although in some example scenarios illustrated herein the frequency assigned by the scheduler 36 is primarily for the uplink (UL).

The communications interface 38 facilitates communication between the base station BS and the wireless terminal (UE) 30 over a radio or air interface. Such communication may employ the frame and/or sub-frame 32 as before mentioned. The subframe itself is described by various resources assigned by the scheduler 36. The communications interface 38 may comprise or connect to one or plural antenna elements depending on the type of technology utilized.

In some example embodiments a communication link is provided between a macro base station node 24 and a micro base station node 26. Specifically, an inter-processor communication link may be provided. This communication link permits exchange of information about the respective sub-bands associated with the macro cell and the micro cell. Additionally, sub-band negotiation procedures may be performed via this communication link between the macro base station node and the micro base station node. Such communication between the macro base station node and the micro base station node may be via a communication link may be based on the X2 interface as defined, for example, for LTE Release 8 (see 3GPP TS 36.423, Evolved Universal Terrestrial Radio Access (E-UTRA), X2 application protocol (X2AP)). Specifically, any of the Information Elements (IEs) exchanged over the X2 interface may be used for sub-band signalling purposes, including the Overload Indicator (OI) and the High Interference Indication (HII).

Figure 5:
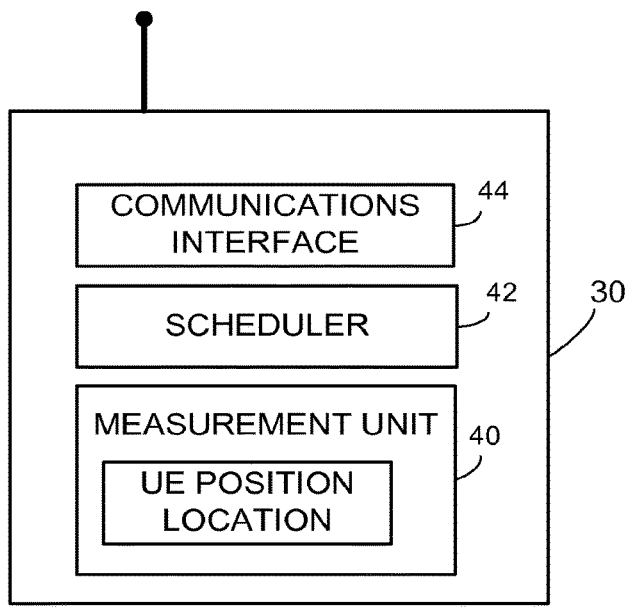
FIG. 5 is a diagrammatic view of portions of an example embodiment of a generic wireless terminal.

FIG. 5 shows an example embodiment of basic structure of a wireless terminal (UE) 30. Among its other units and functionalities (known to the person skilled in the art), wireless terminal (UE) 30 of FIG. 5 comprises measurement unit 40; scheduler 42; and communications interface 44. The measurement unit 40 performs measurements which are reported via communications interface 44 over the radio interface to the base station BS. The measurements obtained by measurement unit 40 enable the terminal locator 34 of the base station BS to determine the location of wireless terminal 30, so that the terminal locator 34 can ascertain whether the wireless terminal (UE) 30 is in a center region M or an edge region R of a cell served by the base station BS.

Figure 6:
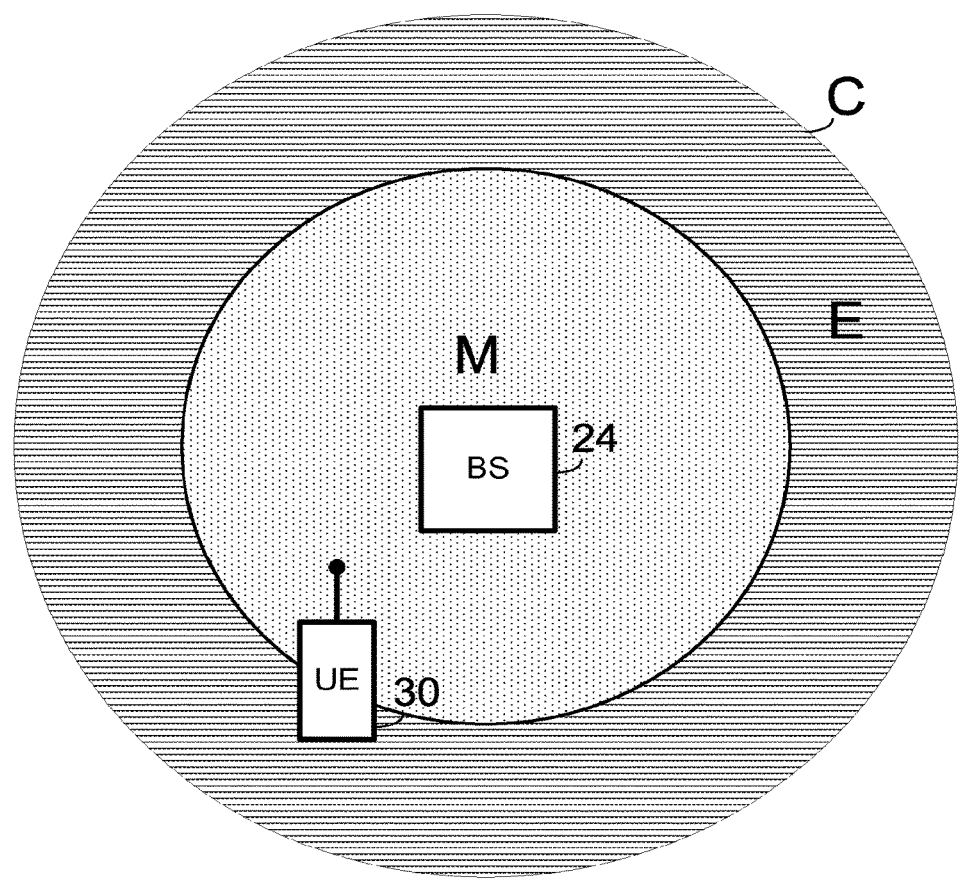
FIG. 6 a diagrammatic view illustrating a center region M of a cell and a edge region E of a cell.

It was mentioned above that terminal locator 34 obtains an indication of location of a wireless terminal 30. As used herein "location" of a wireless terminal refers to geographic location, e.g., whether the wireless terminal is in a center region or an edge region for the cell served by the base station node. FIG. 6 illustrates a generic cell C as being divided into center or middle region M and edge region E. In FIG. 6 (as in various other figures) the center region M of the cell C is shown by stippling (e.g., dotted texture). For the particular situation shown in FIG. 6 (but not necessarily in all other figures) the edge region E is depicted by horizontal hatching.

One or more metrics may be employed to determine whether a wireless terminal (UE) 30 is in a center region M of a cell or an edge region E of a cell. For example, a signal to interference/noise ratio (SINR) may be evaluated to ascertain whether the wireless terminal (UE) 30 is in a center region M of a cell or an edge region E of a cell. In this regard, a SINR value is measured by the measurement unit 40 and reported via the communications interface 44 from the wireless terminal (UE) 30 to the base station BS. The terminal locator 34 of the base station BS receives the SINR value reported by the wireless terminal (UE) 30 and makes a determination whether the reporting wireless terminal is in a center region M of the cell served by the base station or in an edge region E of the cell served by the base station. A SINR value which is lower than a predetermined value or threshold may be considered by the terminal locator 34 of the base station BS to be indicative of the wireless terminal being in the center region M of a cell, while conversely a SINR value exceeding the predetermined value or threshold may be indicative of the wireless terminal being in the edge region E of a cell.

SINR is typically derived from a reference signal received power (RSRP) measurement and a received signal strength indicator (RSSI). Therefore a wireless terminal may measure the reference signal received power (RSRP) to obtain an estimate of signal power, and then evaluate (e.g., measure) another metric such as received signal strength (RSSI) and look at total received signal power, which may provide an estimate of interference.

Another metric may be path loss. In this regard, an estimate the distance of the wireless terminal from the base station may be related to path loss based on timing delay between the wireless terminal and the received signal base station. Thus, one or more (e.g., a combination) of these metrics may be compared to a predetermined value or threshold to ascertain whether the wireless terminal is in the center region M of a cell or the edge region E of a cell.

Based on measurements performed, e.g., by measurement unit 40, a wireless terminal (UE) 30 typically provides feedback regarding a cell for which the wireless terminal (UE) 30 is receiving the best SINR. If not already in that best cell, the network typically directs that a handover (HO) be performed so that the wireless terminal is "handed over" to the best cell, so that the best cell can serve as the serving cell for the wireless terminal. The scheduling decisions (e.g., resource allocations) for the wireless terminal (UE) 30 are made with respect to the serving cell, e.g., by the base station of the serving cell.

Thus, a particular wireless terminal (UE) 30 may indicate when the wireless terminal believes that a handover (HO) should occur, but it is up to the network to make the handover (HO) or assignment and to a serving cell which the network believes is the strongest cell for the wireless terminal. The serving cell could be a macro cell or a micro cell. Once assigned to a serving cell, the schedule of the serving cell (whether a macro cell or a micro cell) makes decisions as to which resources are to be assigned.

The technology disclosed herein concerns how those decisions are made and provides various techniques and strategies for allocating the frequency resources for a heterogeneous radio access network. As explained herein, the techniques and strategies for allocating the frequency resources depends on where the wireless terminal is in the serving cell, e.g., whether the wireless terminal is in a center region M of the serving cell or the edge region E of the serving cell (see FIG. 6). One basic concept of the technology disclosed herein is to incorporate the assignment of frequency resources between the macro and micro base stations as part of a fractional frequency reuse scheme.

Figure 3A:
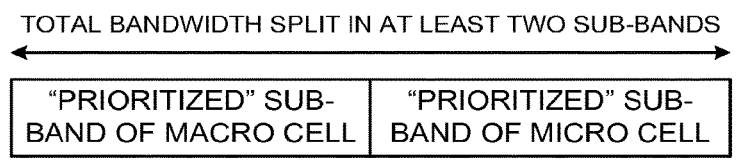
FIG. 3A is a diagrammatic view illustrating a partitioning into a first "prioritized" sub-band associated with one or more cells of a first cell layer and a second "prioritized" sub-band associated with one or more cells of a second cell layer.

To implement FFR-based inter-cell interference coordination (ICIC) in a heterogeneously deployed cellular communication network comprising two or more cell layers, continuous or discontinuous spectral resources available for UL transmissions are partitioned into at least two sub-bands. FIG. 3A illustrates such a partitioning into a first "prioritized" sub-band associated with one or more cells of a first cell layer (e.g., macro cell layer) and a second "prioritized" sub-band associated with one or more cells of a second cell layer (e.g., micro cell layer). As becomes apparent from FIG. 3A, the two sub-bands are disjunctive from each other, which means that there is no (or at least no considerable) spectral overlap between the two sub-bands. It will be appreciated that for each additional cell layer, a dedicated additional "prioritized" sub-band will be added. In an example network implementation with three cell layers, the available uplink transmission bandwidth will thus be split in three sub-bands, and so on.

In one of its aspects the technology disclosed herein concerns a method of operating a heterogeneous radio access network, such as that illustrated by way of example in FIG. 1-FIG. 6. FIG. 7 illustrates representative, basic acts or steps performed in a generic mode of the method. Act 7-1 comprises dividing a frequency bandwidth usable by the heterogeneous radio access network into a partitioned portion (which is less than the entire bandwidth). As simply illustrated in FIG. 8 and FIG. 9, the frequency bandwidth usable by the heterogeneous radio access network may be split (as indicated by broken line S) into plural partitions, e.g., first partition P1 and second partition P2 in the example of FIG. 8 and FIG. 9. As noted above, a partition or partitioned portion may be a subset (e.g., one or more frequencies or sub-carriers) of the frequency bandwidth usable by the heterogeneous radio access network. A partition plan (PP) describes the manner in which the frequency bandwidth usable by the heterogeneous radio access network is split into its plural partitions. The partition plan (PP) is distributed or otherwise provided to plural base station nodes of the heterogeneous radio access network 20, e.g., to the macro base station nodes and to the micro base station nodes.

In one embodiment and mode illustrated by FIG. 8, act 7-1 may occur at a central node or management node of the heterogeneous radio access network 20, such as management node 50 illustrated in FIG. 8. For example, in one example embodiment a frequency spectrum divider (e.g., partitioner) 52 may be configured to divide the frequency bandwidth usable by the heterogeneous radio access network into the plural partitions based either on direct user input or by criteria from which the processor or computer determines how to create the partition plan and thus how best to split or divide the frequency bandwidth. The frequency spectrum divider or partitioner 52 of the management node 50 may be implemented by a processor or computer of management node 50. In such example embodiment wherein the management node 50 divides the frequency bandwidth, the partition plan may be downloaded from the management node 50 to the plural base stations of the heterogeneous radio access network 20 as depicted by arrows D in FIG. 8.

In another embodiment and mode illustrated by FIG. 9, the act 7-1 of dividing the frequency bandwidth usable by the heterogeneous radio access network into a partitioned portion comprises loading the partition plan into the base station nodes of the heterogeneous radio access network 20. In other words, the pre-configured partition plan may be stored or loaded into the plural base station nodes of the heterogeneous radio access network 20, either by downloading or other (e.g., direct) input into the scheduler 36 of the plural base station nodes.

Act 7-2 and act 7-3 are primarily performed by base station nodes of the heterogeneous radio access network 20. Act 7-2, which may be performed by a scheduler 36 of a micro base station node, comprises assigning a frequency of the partitioned portion to a wireless terminal in an edge region of the micro cell. Act 7-3 may be performed by a micro base station node of the heterogeneous radio access network 20. Act 7-3 comprises assigning a frequency of the frequency bandwidth to a wireless terminal which is in a center region of the micro cell. The assigning of frequencies to wireless terminals in the center region of a micro cell is performed by the micro base station which serves the wireless terminal. The frequency assignment to a wireless terminal is in a center portion of a cell may be by different criteria than that of a wireless terminal in an edge portion of the cell. For example, the micro base station may assign a frequency of the frequency bandwidth without regard to the partitioned portion (e.g., at any suitable frequency in the frequency bandwidth without constraint of the partitioned portion) if the wireless terminal is in a center portion of the micro cell.

FIG. 7A illustrates an enhanced version of the method of FIG. 7 which includes act 7-4, in addition to act 7-1, act 7-2, and act 7-3. Act 7-4 comprises assigning a frequency of the frequency bandwidth if the cell served by the base station node is a macro cell and the wireless terminal is in a center portion of the macro cell or does not substantially interfere with a micro cell. The assigning of frequencies to wireless terminals which are at least within a center region of the macro cell is performed by a scheduler 36 of the macro base station node which serves the wireless terminal. For example, for act 7-4 the frequency may be assigned by different criteria, e.g., without regard to the partitioned portion, so that the assignment may be essentially anywhere within the frequency bandwidth without being limited to the partitioned portion.

The phraseology "at least within a center region" is employed so that it will be understood that the generic method of FIG. 7 covers some embodiments in which only wireless terminals in the center region are actually assigned frequencies without regard to the partitioning (e.g., assigned any frequency of the entire frequency bandwidth usable by the heterogeneous radio access network), and also covers some embodiments in which not only are wireless terminals in the center region are actually assigned frequencies without regard to the partitioning, but wireless terminals in other regions of the cell (e.g., even in an edge region of the cell) may be assigned frequencies without regard to the partitioning.

FIG. 7B shows a more detailed mode of the basic method of FIG. 7. The FIG. 7B mode further includes performance of act 7-1B, preferably prior to act 7-2. Act 7-1B is performed by a base station node of the heterogeneous radio access network 20 (either a macro base station node or a micro base station node). Act 7-1B may be performed for each wireless terminal in the heterogeneous radio access network, and for each wireless terminal is performed by the base station of the serving cell for the wireless terminal. Act 7-1B comprises determining whether the wireless terminal is in the center region or the edge region of the micro cell. The terminal locator 34 of the base station may make the determination of act 7-1B based on, e.g., measurements received from the wireless terminal. In other respects the mode of FIG. 7B resembles the basic mode of FIG. 7, including act 7-1, act 7-2, and act 7-3.

FIG. 7C shows another more detailed mode of the basic method of FIG. 7. In the FIG. 7C mode, act 7-1(C) comprises dividing the frequency bandwidth usable by the heterogeneous radio access network into plural partitioned portions (each of which is less than the entire bandwidth). The division of the frequency bandwidth into partitions is understood from the preceding discussion of FIG. 8, and can be performed by a control or management node of the heterogeneous radio access network 20 or by loading a pre-configured partition plan into the base station nodes of the heterogeneous radio access network 20.

Act 7-2(C) comprises assigning frequencies from the partitioned portions to wireless terminals in an edge region of the macro cell and wireless terminals in an edge region of the micro cell. Act 7-2(C) is performed by a scheduler 36 of a micro base station node for wireless terminals in an edge region of a micro cell, and is performed by a scheduler 36 of a macro base station for wireless terminals in an edge region of a macro cell. In being assigned a frequency from a partitioned portion, the wireless terminal is not able to be assigned a frequency from the entire frequency bandwidth without regard to partitioning. In other words, the frequency assignment for the wireless terminal is restricted to one of the plural partitions and thus the entire frequency spectrum is not eligible for assignment.

As in the generic method, act 7-3 comprises assigning a frequency of the frequency bandwidth to a wireless terminal which is in a center region of the micro cell or at least within a center region of the macro cell. In some example embodiments the assignment of act 7-3 may be without regard to the partitioned portion(s).

The FIG. 7C mode is also illustrated and amplified by various example modes and embodiments described below.

It will be appreciated that the enhancement of act 7-4 of FIG. 7A may also be performed in conjunction with the methods of FIG. 7B and FIG. 7C.

The basic method of FIG. 7, and the additional methods of FIG. 7A, FIG. 7B, and FIG. 7C, are illustrated and amplified by the resource allocation strategies of the various example modes and embodiments described below.

Figure 10A:
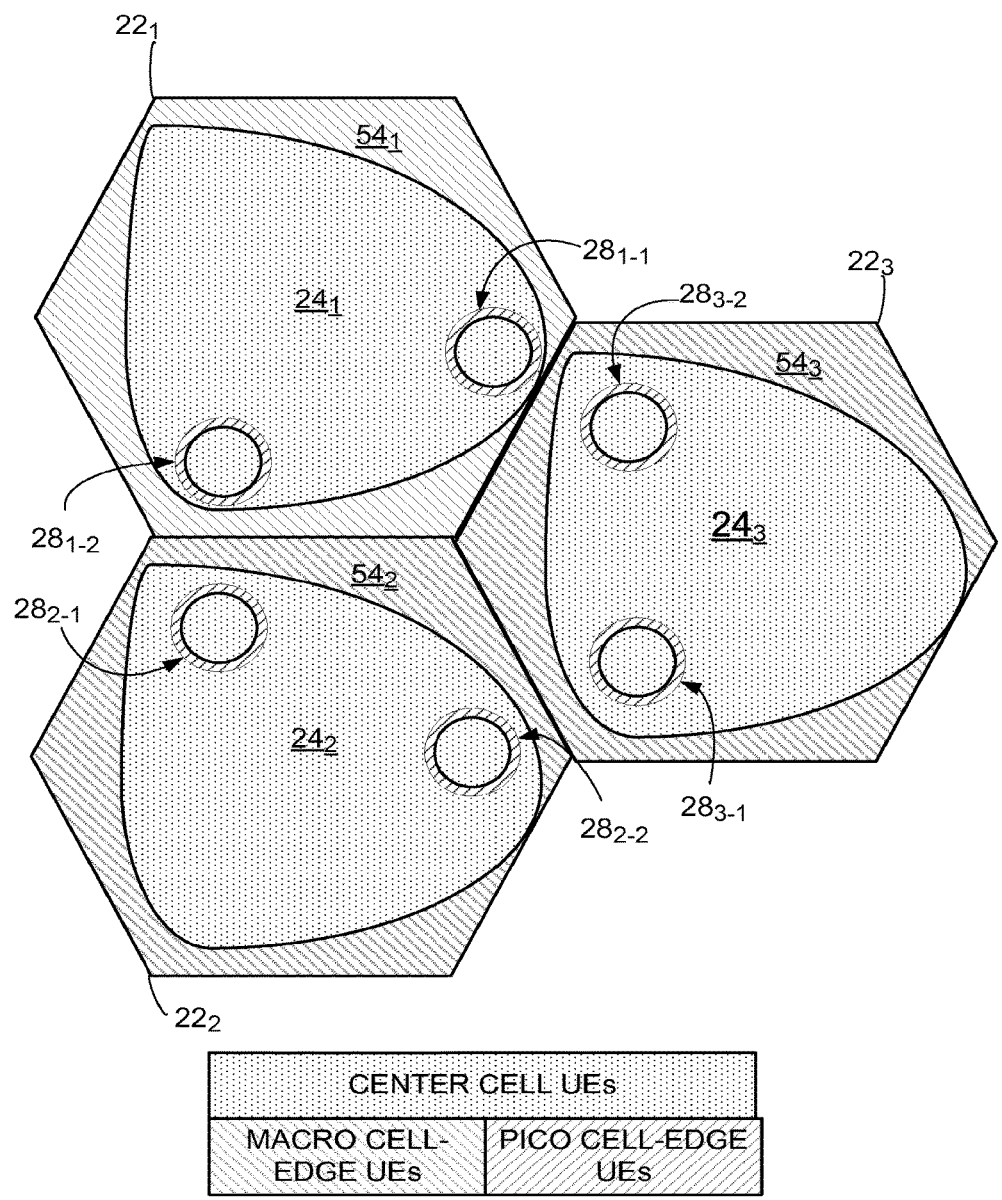

FIG. 10A illustrates a resource allocation strategy in which (like in the generic method of FIG. 7) "cell center" wireless terminals, whether in the center of a macro cell or the center of a micro cell, are assigned to any frequency of the frequency band (e.g., are assigned a frequency, e.g., without regard to the partitioning of the partition plan). FIG. 10A further shows that wireless terminals in an edge region E of a macro cell and wireless terminals in an edge region E of a micro cell are assigned to separate frequency partitions to minimize interference between the micro cell wireless terminals and the wireless terminals in the edge region E of a macro cell.

Thus, in the example embodiment illustrated in FIG. 10A the scheduler 36 of a macro base station node is configured to assign a frequency from a first partition (the left partition of FIG. 10A) to the wireless terminal which it serves if the wireless terminal is in an edge region of a macro cell served by the macro base station node. For example, the scheduler 36 of macro base station node 24$_1$ assigns a frequency from the first partition (the left partition of FIG. 10A) to the wireless terminal in edge region 54$_1$.

On the other hand, the scheduler 36 of a micro base station node is configured to assign a frequency from the second partition (the right partition of FIG. 9) to the wireless terminal which it serves if the wireless terminal is in an edge region of a micro cell served by the micro base station node.

It so happens in the example embodiment of FIG. 10A that plural base station nodes assign frequencies from the same partition (the left partition of FIG. 10A) to wireless terminals in their edge regions 54. For example, macro base station $24_1$ assigns frequencies from the left partition of FIG. 10A to wireless terminals in edge region $54_1$; macro base station $24_2$ assigns frequencies from the left partition of FIG. 10A to wireless terminals in edge region $54_2$; and so forth. Similarly, all micro base stations, regardless of in which macro cell they reside, assign frequencies from the right partition of FIG. 10A to wireless terminals in their respective edge regions.

Figure 10B:
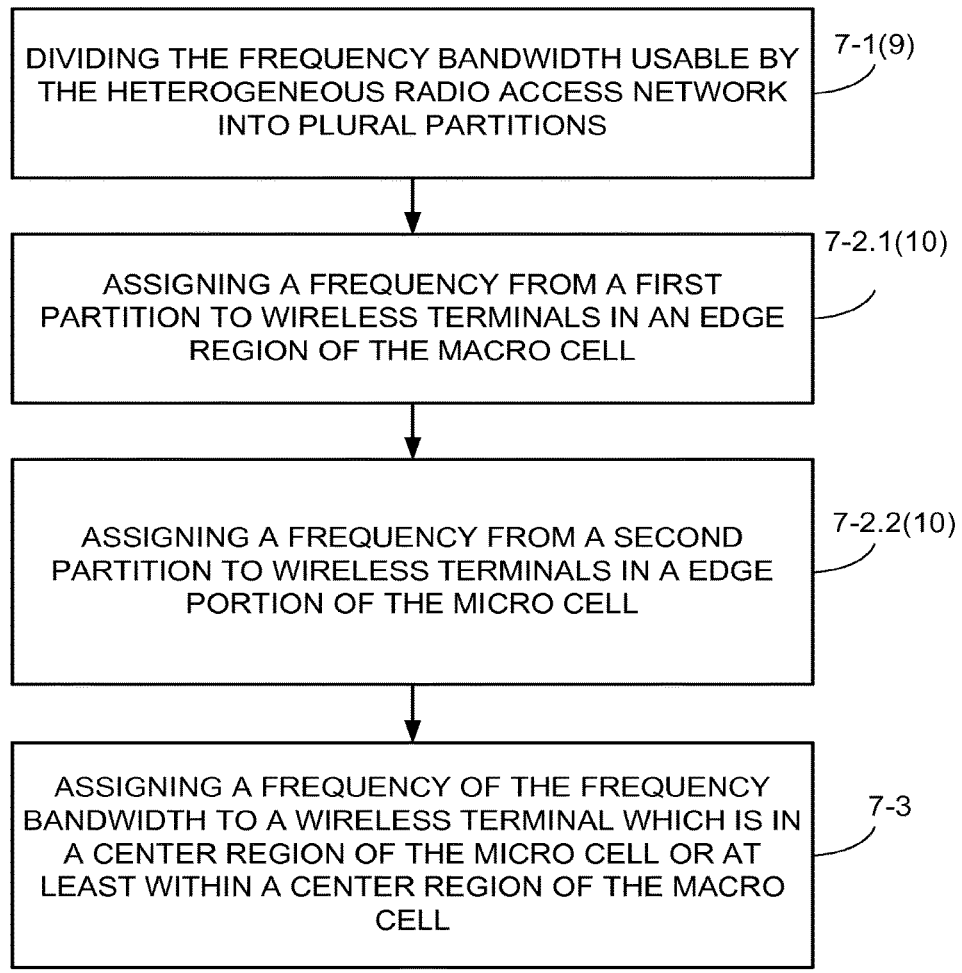

FIG. 10B shows example, representative acts or steps involved in a method of operating a heterogeneous radio access network in accordance with the strategy of FIG. 10A. Act 7-1(9) comprises dividing the frequency bandwidth usable by the heterogeneous radio access network into plural partitions. Act 7-2.1(10) comprises assigning a frequency from a first partition to wireless terminal(s) in an edge region of the macro cell served by the macro base station which performs the act. Act 7-2.1(10) is performed by a scheduler 36 of the macro cell served by the macro base station which performs the act. Act 7-2.2(10) comprises assigning a frequency from a second partition to wireless terminal(s) in an edge region of the micro cell. Act 7-2.2(10) is performed by a scheduler 36 of the micro cell served by the micro base station which performs the act. As in the basic method, act 7-3 comprises assigning a frequency of the frequency bandwidth to a wireless terminal which is in a center region of the micro cell or at least within a center region of the macro cell.

Figure 11A:
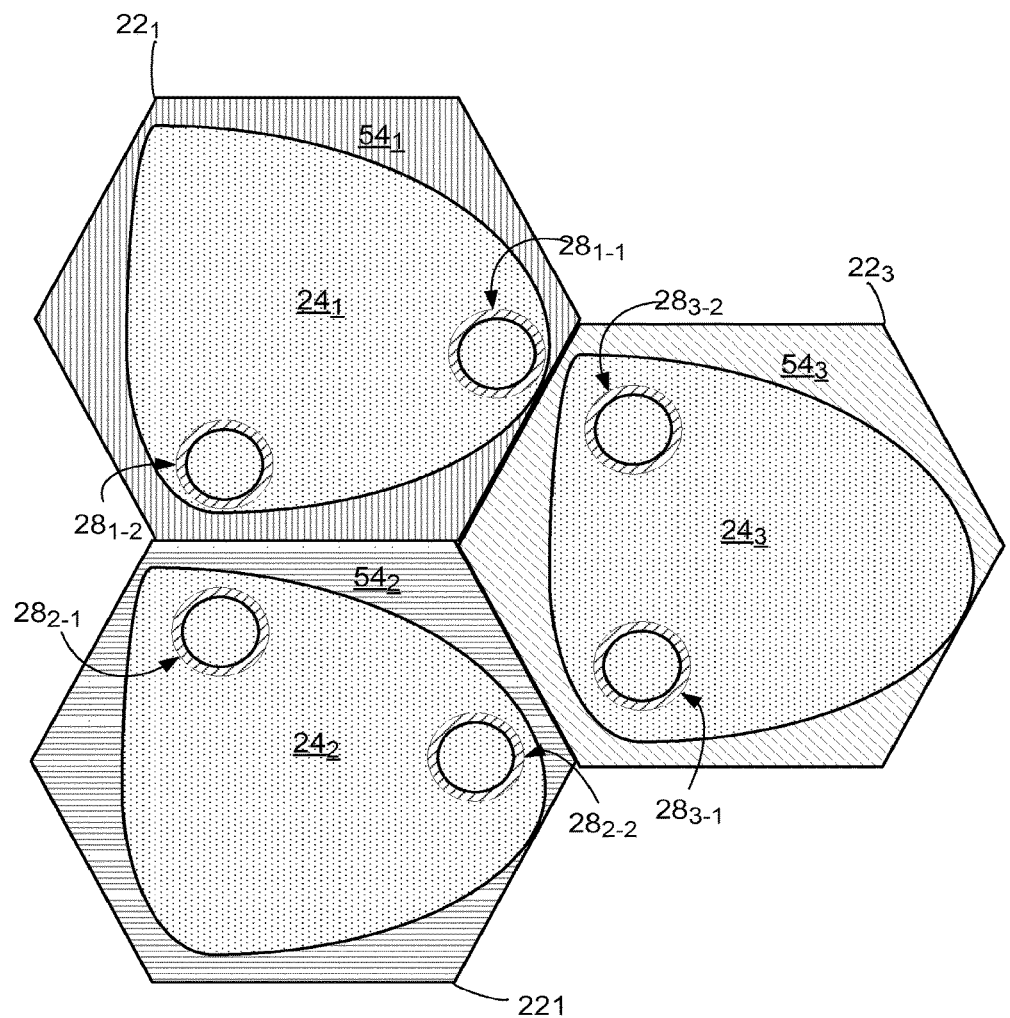
Figure 12A:
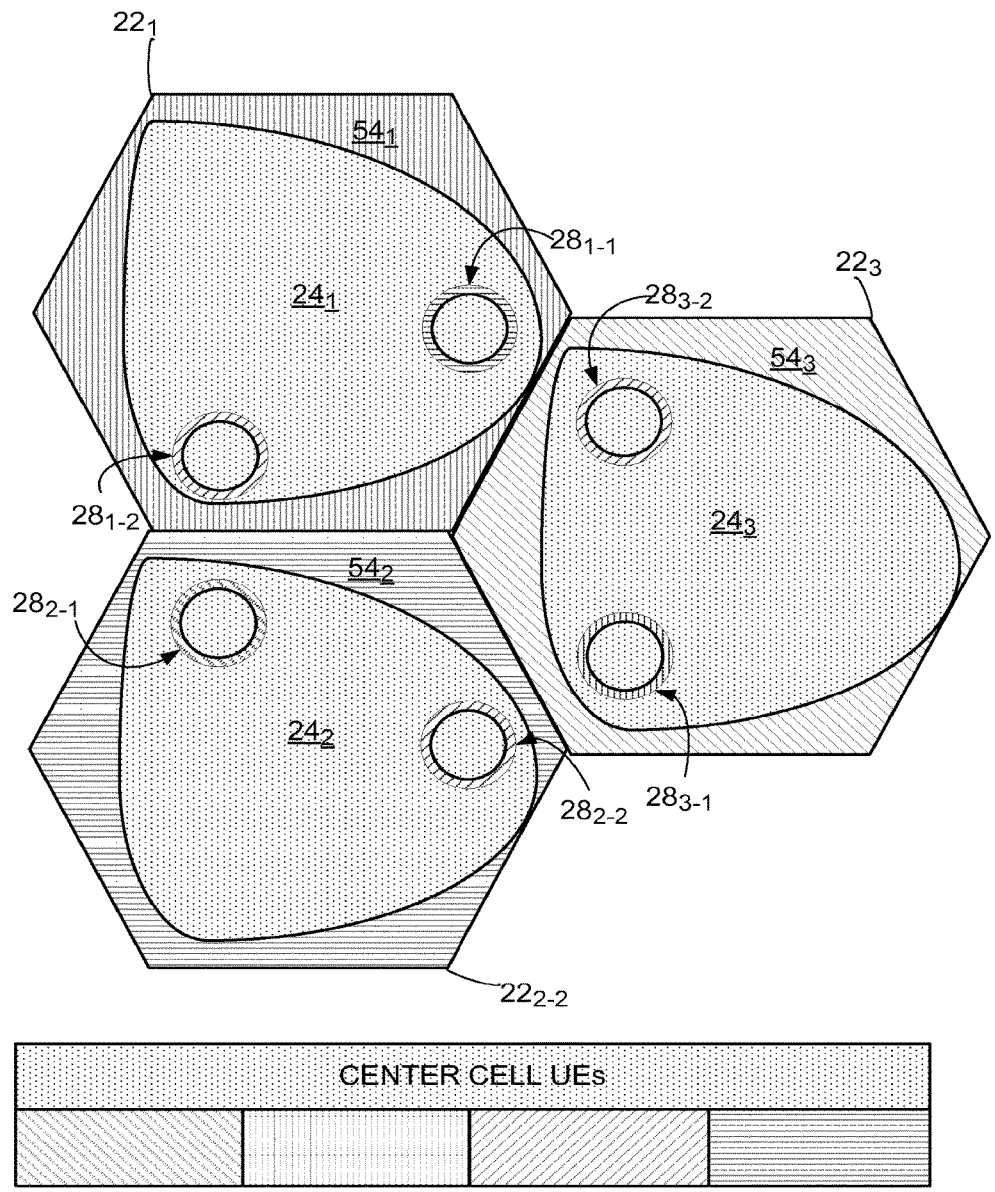

FIG. 11A and FIG. 12A illustrate two additional embodiments in which fractional frequency reuse (FFR) is applied both within a macro cell for cell center and cell edge users, as well as between the micro cells. FIG. 11A and FIG. 12A thus illustrate other resource allocation strategies, and particularly strategies in which the scheduler 36 of a macro base station is configured to assign a frequency from a selected one of plural partitions of the frequency bandwidth if the wireless terminal is in an edge region of the cell served by the macro base station node. The selected one of the plural partitions is a different partition than that which is used by another base station node serving an adjacent macro cell to assign a frequency to another wireless terminal in an edge region of the adjacent macro cell. Moreover, the selected one of the plural partitions may be a different partition than that which is used by a micro base station node within the macro cell to assign a frequency to any wireless terminal within the micro base station node.

Figure 11B:
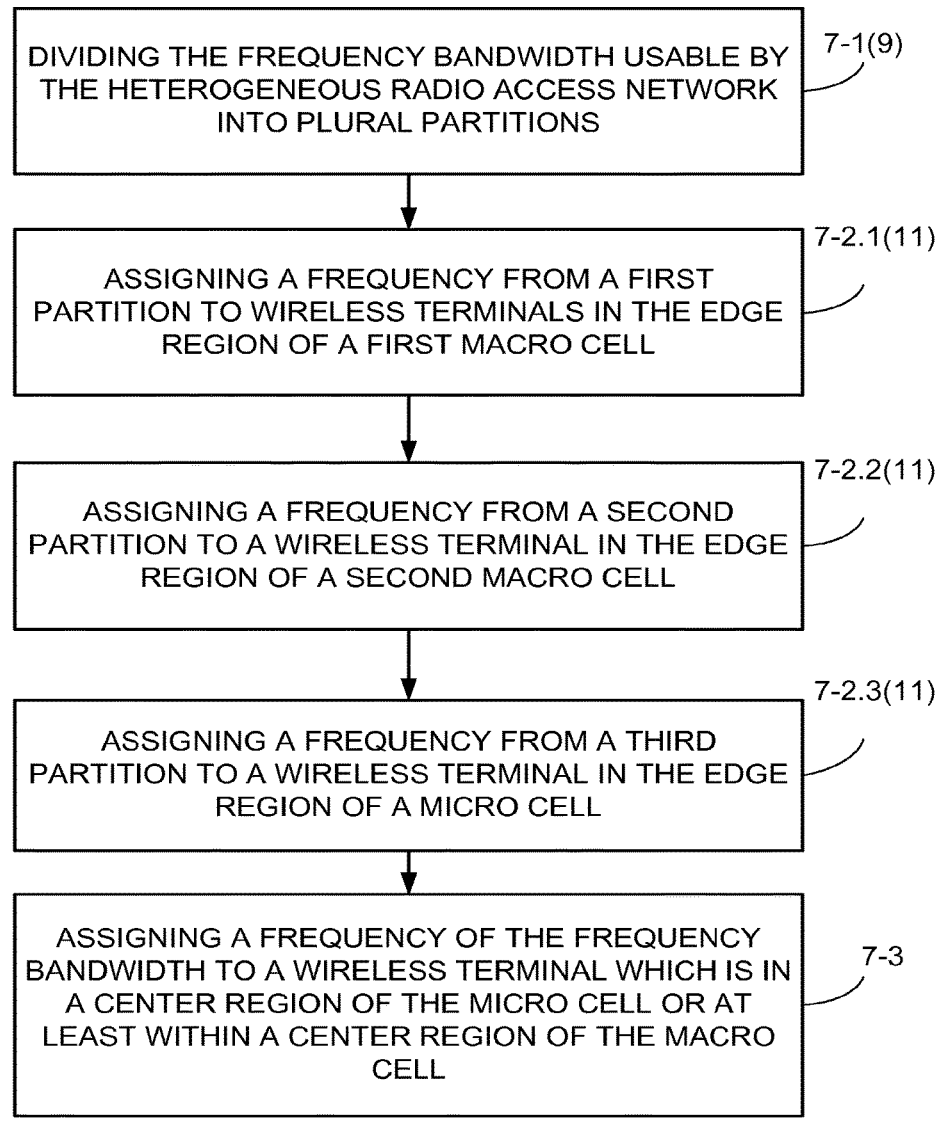

FIG. 11B shows example, representative acts or steps involved in a method of operating a heterogeneous radio access network which is suitable for the strategy of FIG. 11A. Act 7-1(9) comprises dividing the frequency bandwidth usable by the heterogeneous radio access network into plural partitions. In the particular situation of FIG. 11A and FIG. 11B, the frequency bandwidth usable by the heterogeneous radio access network is divided into four partitions.

Act 7-2.1 (11) comprises assigning a frequency from a first partition to wireless terminals in the edge region of a first macro cell. Act 7-2.1(11) is performed by a scheduler 36 of the macro base station of the first macro cell, for example macro base station $24_1$. Act 7-2.2(11) comprises assigning a frequency from a second partition to a wireless terminal in the edge region of a second macro cell. Act 7-2.1(11) is performed by a scheduler 36 of the macro base station of the second macro cell, for example macro base station $24_2$. Act 7-2.3(11) comprises assigning a frequency from a third partition to a wireless terminal in the edge region of a micro cell. As in the basic method, act 7-3 comprises assigning a frequency of the frequency bandwidth to a wireless terminal which is in a center region of the micro cell or at least within a center region of the macro cell.

Figure 11C:
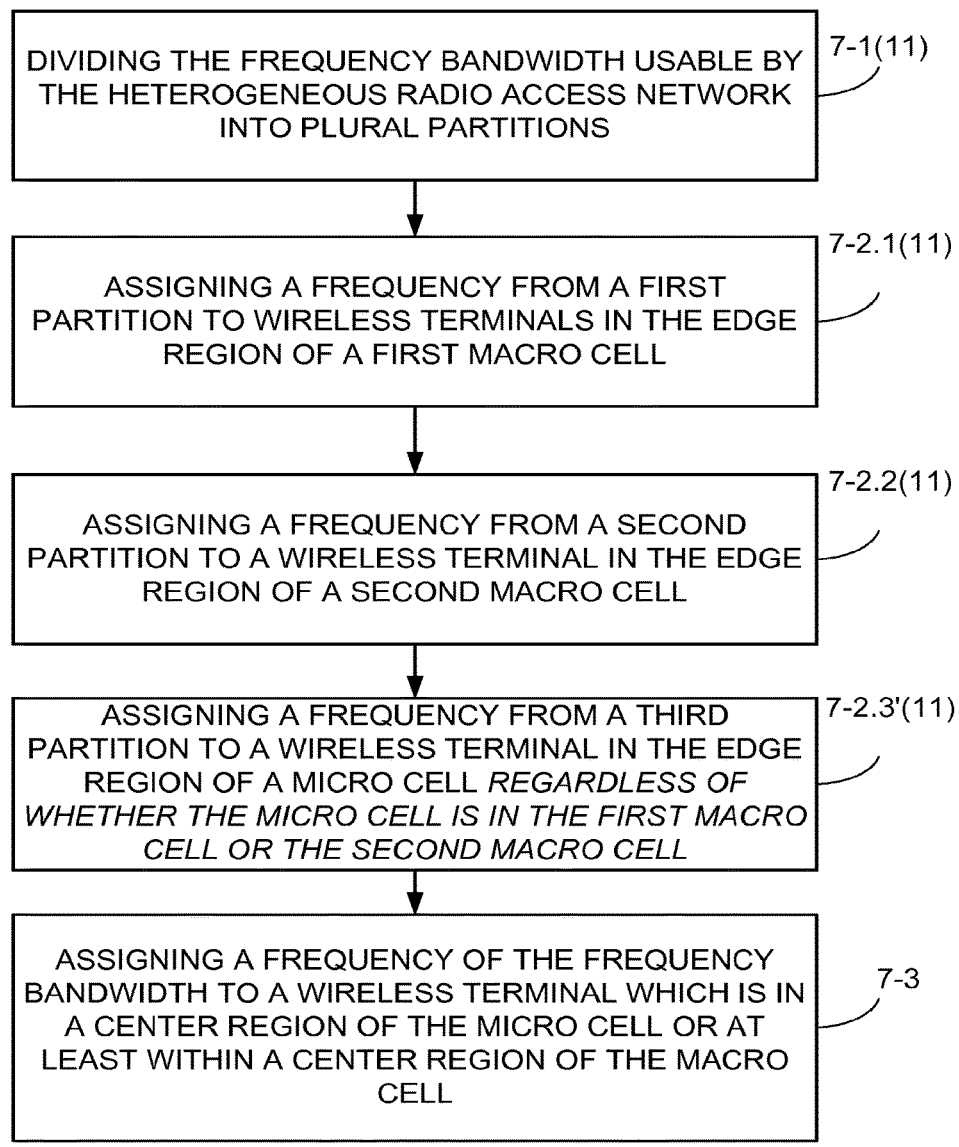

FIG. 11C shows example, representative acts or steps involved in an alternate method of operating a heterogeneous radio access network which is suitable for the strategy of FIG. 11A. The method of FIG. 11C differs from the method of FIG. 11B by replacing act 7-2.3(11) with act 7-2.3'(11). Act 7-2.3'(11) comprises assigning the frequency from the third partition to the wireless terminal in the edge region of a micro cell regardless of whether the micro cell is in the first macro cell or the second macro cell. Act 7-3 comprises assigning a frequency of the frequency bandwidth to a wireless terminal which is in a center region of the micro cell or at least within a center region of the macro cell.

Figure 12B:
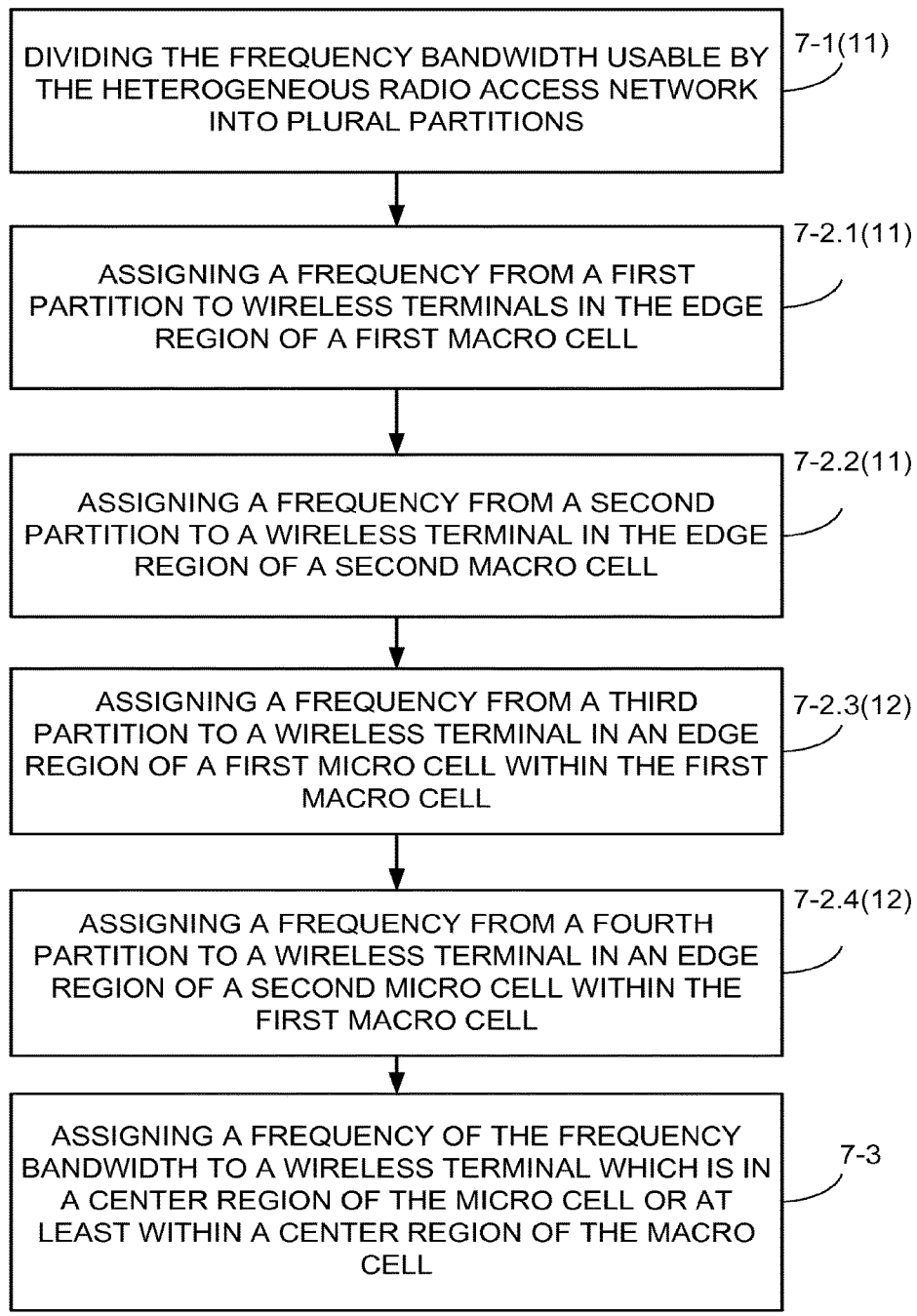

In the resource allocation strategy of FIG. 12A, the selected one of the plural partitions may be a same partition that is used by a micro base station node within another macro cell to assign a frequency to a wireless terminal in an edge region of the micro base station node which is in the another macro cell. In this regard, FIG. 12B shows example, representative acts or steps involved in a method of operating a heterogeneous radio access network which is suitable for the strategy of FIG. 12A. The first three acts of FIG. 12B are similar to those of FIG. 11B. In particular, act 7-1(11) of FIG. 11B comprises dividing the frequency bandwidth usable by the heterogeneous radio access network into plural partitions. Act 7-2.1(11) comprises assigning a frequency from a first partition to a wireless terminal in an edge region of a first macro cell. Act 7-2.2(11) comprises assigning a frequency from a second partition to a wireless terminal in an edge region of a second macro cell. Act 7-2.3(12) comprises assigning a frequency from a third partition to a wireless terminal in an edge region of a first micro cell within the first macro cell. Act 7-2.3(12) comprises assigning a frequency from a fourth partition to a wireless terminal in an edge region of a second micro cell within the first macro cell. Act 7-3 comprises assigning a frequency of the frequency bandwidth to a wireless terminal which is in a center region of the micro cell or at least within a center region of the macro cell.

Figure 12C:
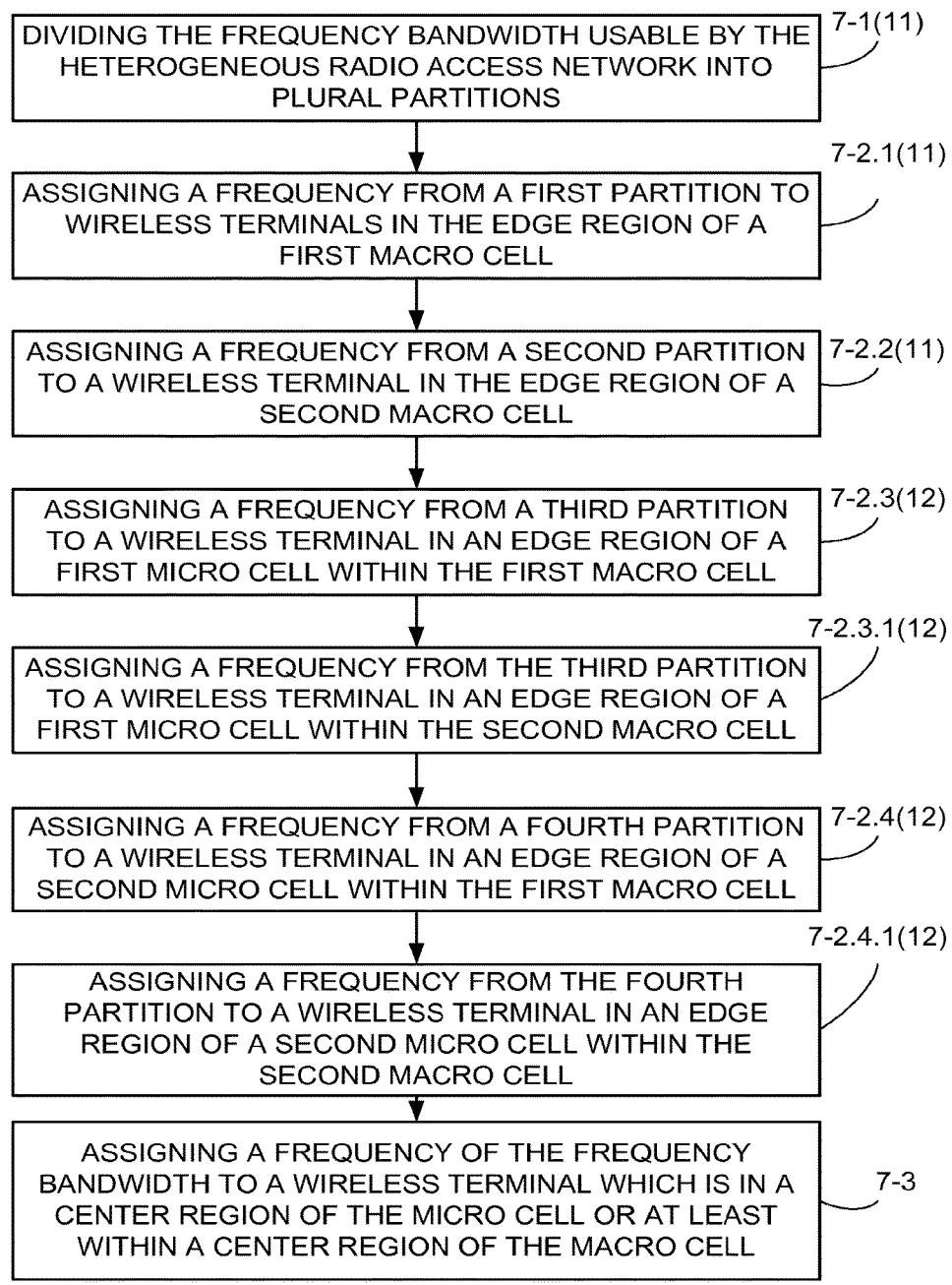

FIG. 12C shows example, representative acts or steps involved in an alternate method of operating a heterogeneous radio access network which is suitable for the strategy of FIG. 12A. The method of FIG. 12C differs from the method of FIG. 12B by inclusion of act 7-2.3.1(12) and act 7-2.4.1(12), which follow act 7-2.3(12) and act 7-2.4(12), respectively. Act 7-2.3.1(12) comprises assigning a frequency from the third partition to a wireless terminal in an edge region of a first micro cell within the second macro cell. Act 7-2.4.1(12) comprises assigning a frequency from the fourth partition to a wireless terminal in an edge region of a second micro cell within the second macro cell.

Figure 13A:
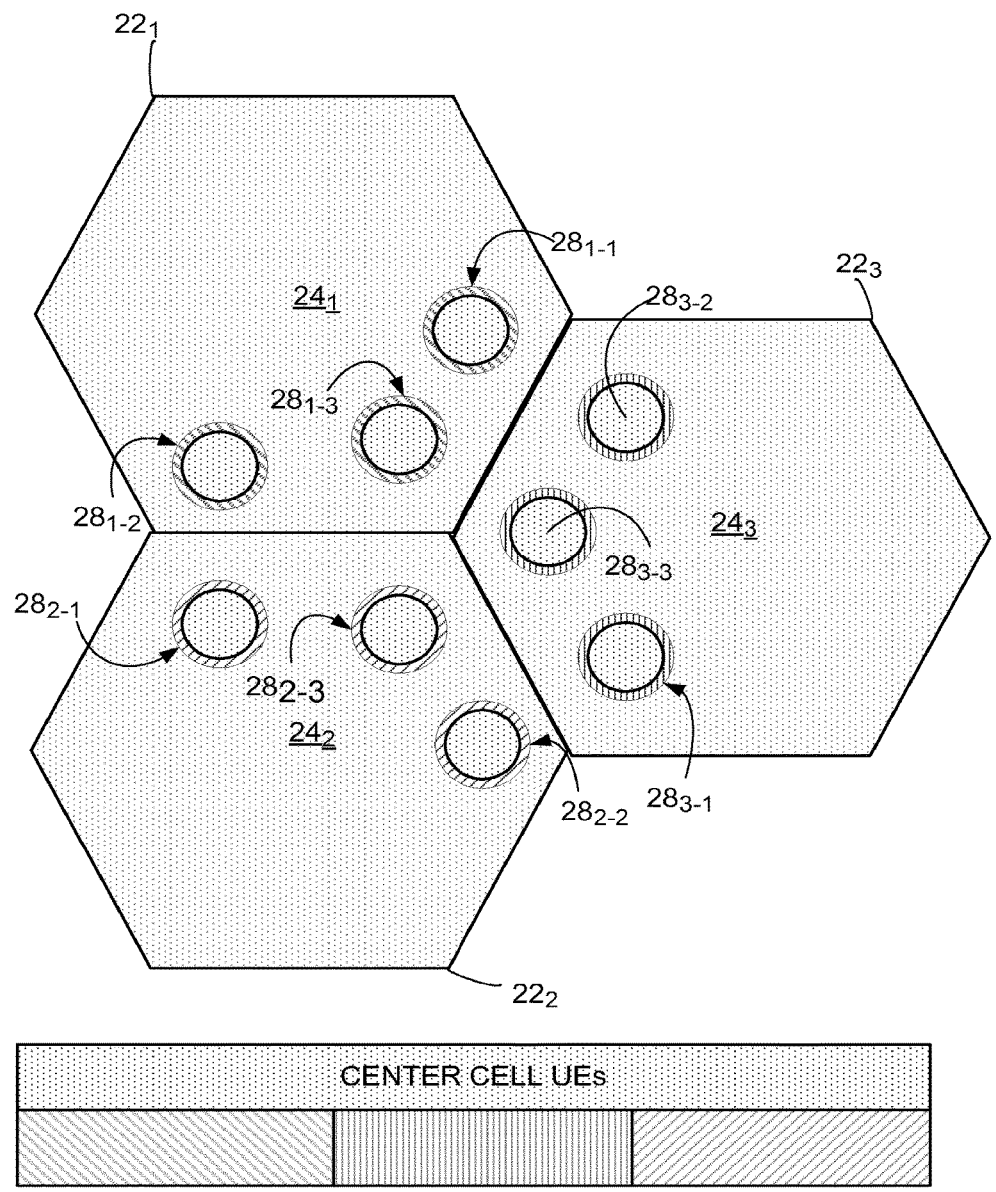

FIG. 13A illustrates an embodiment and mode of the heterogeneous fraction frequency reuse (FFR) technique of the technology disclosed herein in which macro cells employ a traditional N=1 frequency assignment while a rate ⅓ FFR scheme is applied to the micro cells based on the macro cells in which the micro cells reside. The illustration of FIG. 13A employs two micro cells per macro cell, however the technology may be applied to an arbitrary number of micro cells per macro cell (not necessarily the same) and an arbitrary fraction frequency reuse (FFR) rate.

In accordance with the embodiment and mode of FIG. 13A, the scheduler 36 of a micro base station is configured to assign, to a wireless terminal in an edge region of its micro cell, a frequency from a selected one of plural partitions of the frequency bandwidth. The selected one of the plural partitions is a same partition which is used, by another base station node serving another micro cell in a same macro cell, to assign a frequency to another wireless terminal in an edge region of the another micro cell. But the selected one of the plural partitions is different from another partition which is used, by yet another base station node serving another micro cell in another macro cell which is adjacent to the macro cell, to assign a frequency to yet another wireless terminal in an edge region of the yet another micro cell.

Figure 13B:
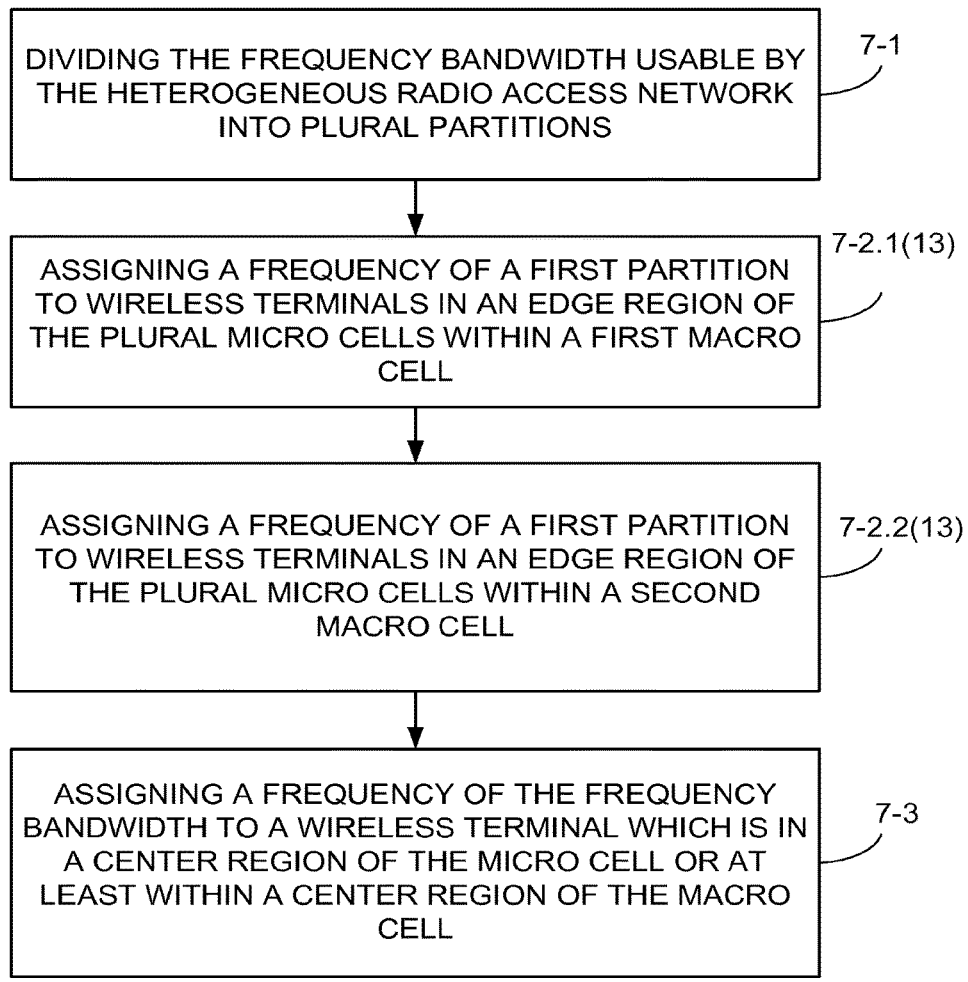

FIG. 13B shows example, representative acts or steps involved in a method of operating a heterogeneous radio access network which is suitable for the strategy of FIG. 13A. Act 7-1 comprises dividing the frequency bandwidth usable by the heterogeneous radio access network into plural partitions. Act 7-2.1(13) comprises assigning a frequency of a first partition to wireless terminals in an edge region of the plural micro cells within a first macro cell. Act 7-2.2(13) comprises assigning a frequency of a second partition to wireless terminals in an edge region of the plural micro cells within a second macro cell. Act 7-3 comprises assigning a frequency of the frequency bandwidth to a wireless terminal which is in a center region of the micro cell or at least within a center region of the macro cell.

Figure 13C:
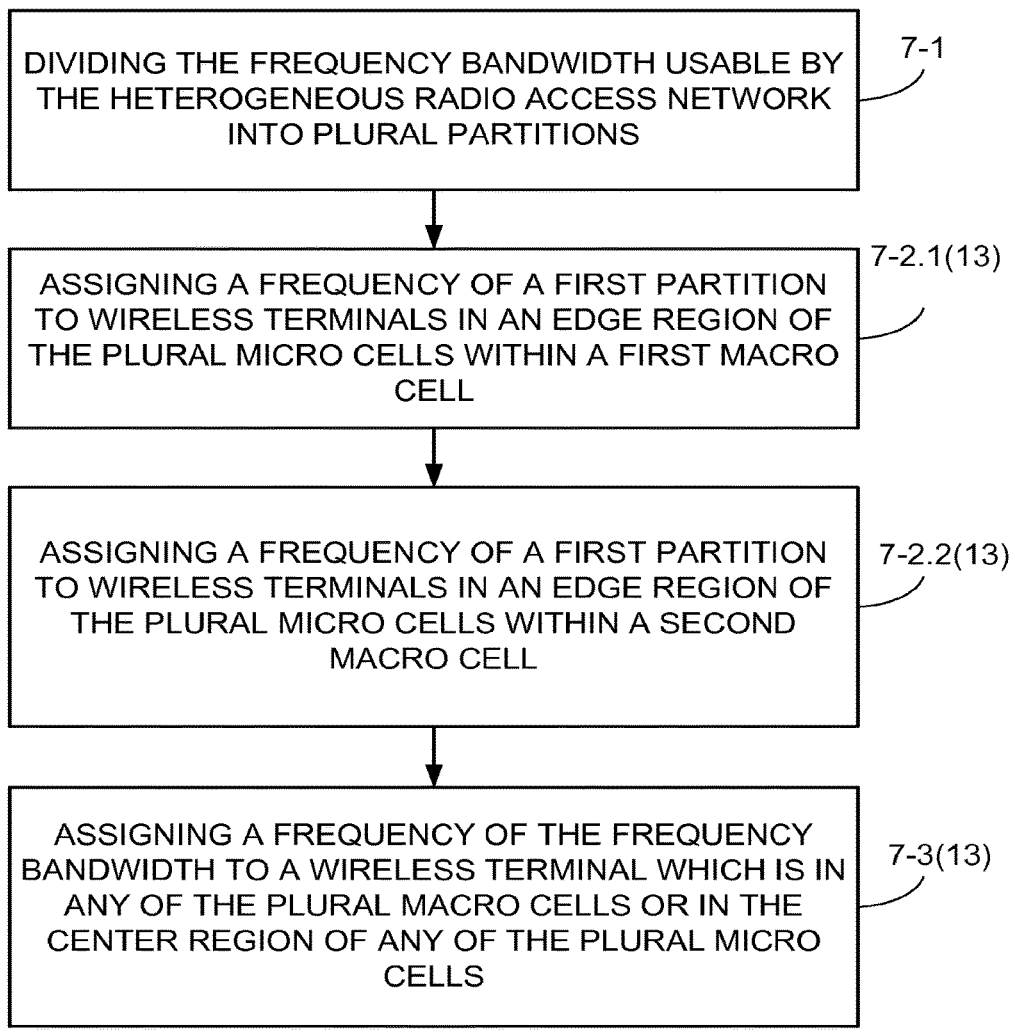

FIG. 13C shows example, representative acts or steps involved in an alternate method of operating a heterogeneous radio access network which is suitable for the strategy of FIG. 13A. The method of FIG. 13C differs from the method of FIG. 13B by virtue of substitution of act 7-3(13) for act 7-3. Act 7-3(13) comprises assigning a frequency of the frequency bandwidth to a wireless terminal which is in any of the plural macro cells (without regard to where in the macro cells) or in the center region of any of the plural micro cells.

Figure 14A:
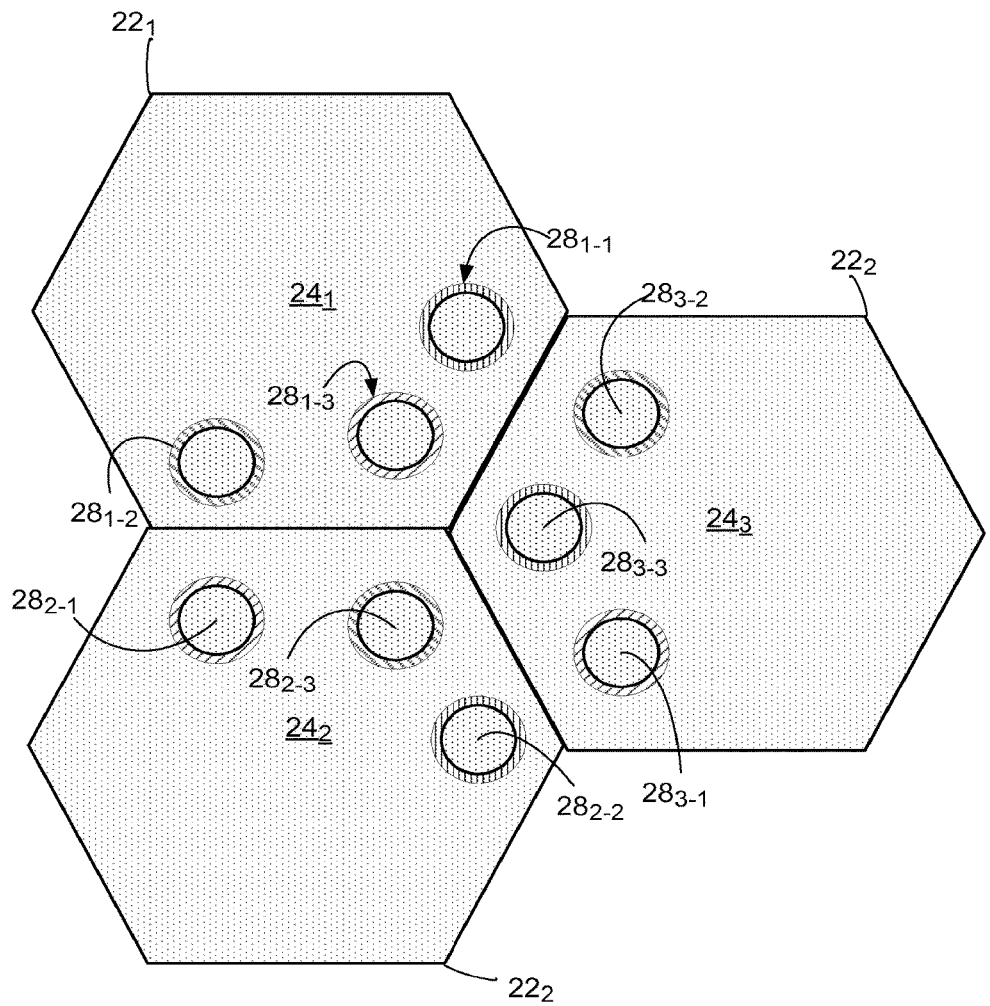

FIG. 14A illustrates an embodiment and mode in which the macro cells again use an N=1 deployment, but the fraction frequency reuse (FFR) scheme may be applied across the micro cells within each macro cell. The micro-cell fraction frequency reuse (FFR) assignments are staggered between micro cells across macro cell boundaries to ensure that no two neighboring micro-cells share the same fraction frequency reuse (FFR) partition.

In accordance with the resource allocation strategy of FIG. 14A, the scheduler 36 of a micro base station is configured to assign (to a wireless terminal in its edge region) a frequency from a selected one of plural partitions of the frequency bandwidth. The selected one of the plural partitions is a different partition than that which is used, by another base station node serving another micro cell in a same macro cell, to assign a frequency to another wireless terminal in an edge region of the another micro cell.

Figure 14B:
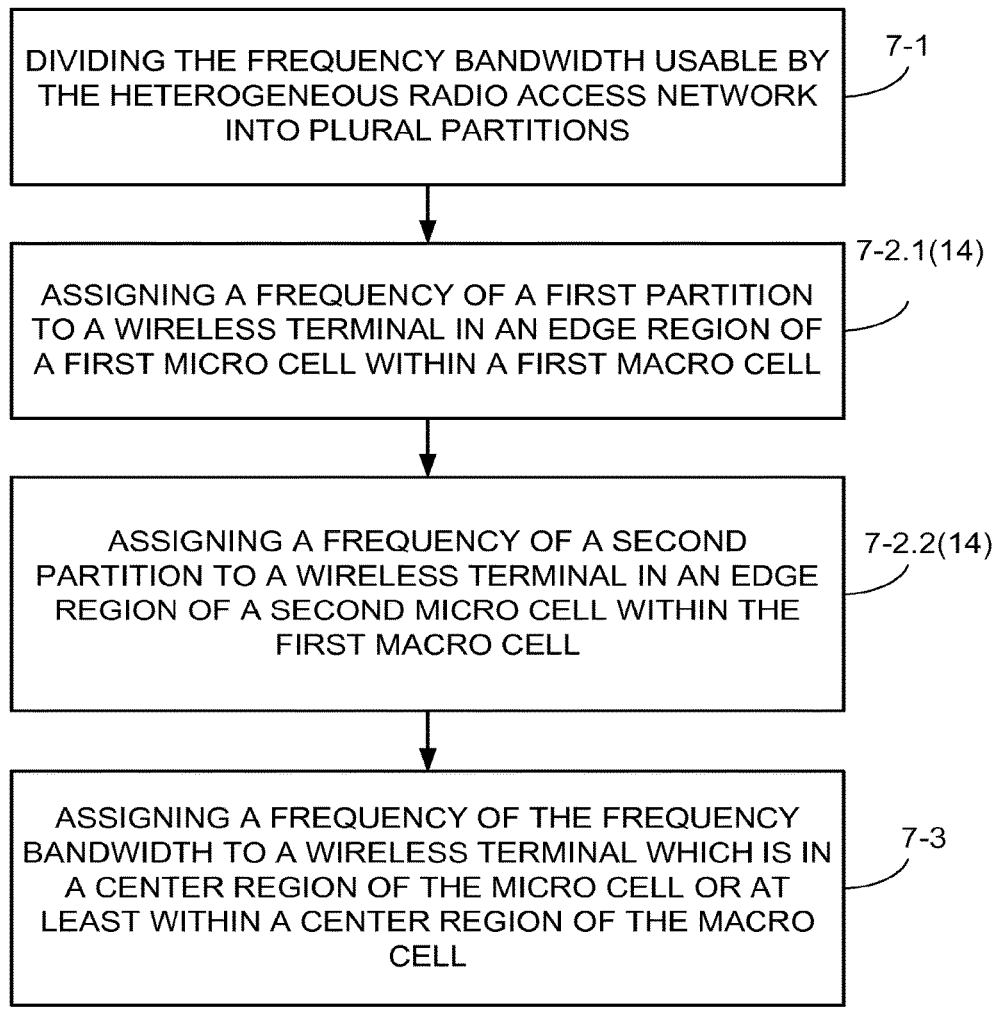

FIG. 14B shows example, representative acts or steps involved in a method of operating a heterogeneous radio access network which is suitable for the strategy of FIG. 14A. Act 7-1 comprises dividing the frequency bandwidth usable by the heterogeneous radio access network into plural partitions. Act 7-2.1(14) comprises assigning a frequency of a first partition to a wireless terminal in an edge region of a first micro cell within a first macro cell. Act 7-2.1(14) comprises assigning a frequency of a second partition to a wireless terminal in an edge region of a second micro cell within the first macro cell. Act 7-3 comprises assigning a frequency of the frequency bandwidth to a wireless terminal which is in a center region of the micro cell or at least within a center region of the macro cell.

Figure 14C:
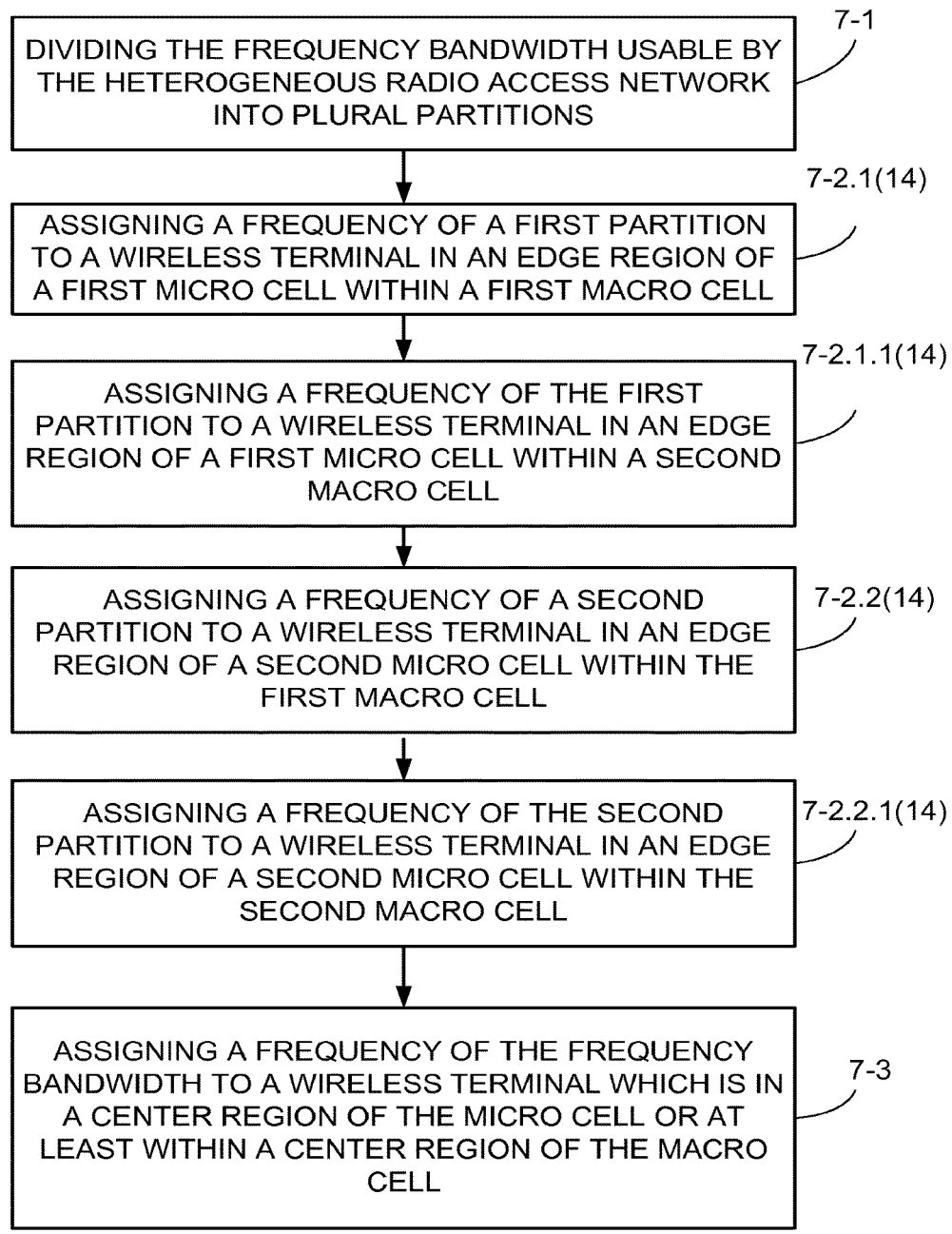

FIG. 14C shows example, representative acts or steps involved in an alternate method of operating a heterogeneous radio access network which is suitable for the strategy of FIG. 14A. The method of FIG. 14C differs from the method of FIG. 14B by inclusion of act 7-2.1.1(14) and act 7-2.2.1(14), which follow act 7-2.1(14) and act 7-2.2(14), respectively. Act 7-2.1.1(14) comprises assigning a frequency of the first partition to a wireless terminal in an edge region of a first micro cell within a second macro cell. Act 7-2.2.1(14) comprises assigning a frequency of the second partition to a wireless terminal in an edge region of a second micro cell within the second macro cell.

In some example embodiments and/or modes, known as sub-partitioned embodiments and/or modes, the frequency bandwidth usable by the heterogeneous radio access network is divided into plural partitions and the plural partitions are further divided into plural sub-partitions. Some example sub-partitioned embodiments and/or modes involve multiple stages of partitioning. For example, some example embodiments and modes involve two stages of partitioning. A first partition is associated with the plural macro cells and a second partition is primarily (but not necessarily exclusively) associated with the plural micro cells.

Two example sub-partitioned embodiments and/or modes are illustrated in FIG. 15 and FIG. 16. Both FIG. 15 and FIG. 16 show the frequency bandwidth usable by the heterogeneous radio access network being divided into a first partition B1 and a second partition B2, and further show that the first partition B1 is sub-divided into sub-partitions B11, B12, and B13 and that the second partition B2 is sub-divided into sub-partitions B21, B22, and B23. FIG. 15 shows that first partition B1 is a sub-band for interfering macro UEs or macro cell edge UEs, while the second partition B2 is for, e.g., micro cell edge UEs. FIG. 16 shows that the first partition B1 is a reserved sub-band of macro base station BS1, while the second partition B2 is a reserved sub-band of pico (e.g., micro) base stations.

In the FIG. 15 embodiment and mode a two stage bandwidth partitioning is employed with four sub-bands employed for the macro-cell UEs. The approach of FIG. 15 addresses, e.g., the asymmetrical interference between the macro and micro-cells of the heterogeneous network. In combination with a PFTF (proportional fair in time and frequency) scheduling of the UEs, the embodiment of FIG. 15 achieves both an interference reduction and SINR improvement for the micro cell users while maintaining the macro cell SINR levels.

In a heterogeneous deployment, the set of transceiver devices sensitive to interference may not correspond to the set of transceiver devices causing strong inter-cell interference. As an example, transceiver devices served in micro cells and sensitive to interference are not necessarily causing much interference to transceiver devices that are served in adjacent or overlapping macro cells and sensitive to interference. In a similar manner, transceiver devices served in a macro cell and close to the border of a micro cell may not necessarily be the ones that cause the strongest interference in the micro cell.

In the uplink (UL) of a heterogeneous radio access network 20 (HetNet) such as that illustrated in FIG. 15, an interfering macro wireless terminal (UE) is not necessarily the same as a cell-edge macro wireless terminal (UE). A macro wireless terminal interfering with the neighboring macro base station is usually located at the edges of its serving macro cell. A macro wireless terminal interfering with a micro base station located within the same macro cell area of the considered macro wireless terminal has a low pathloss (e.g., short distance) to the micro base station and a large pathloss to the macro base station. Cell-edge macro wireless terminals have a large pathloss to their serving base station but not all of them are close to the micro base station. There may be macro wireless terminals interfering with the micro base station in the uplink (UL) and that are usually not categorized as cell-edge wireless terminals. The hatched region in FIG. 15A shows a region where the macro wireless terminals of macro base station $24_i$ which potentially strongly interfere with micro cell $28_{i-1}$ may be located.

The resulting throughput gains achieved by the two stage bandwidth partitioning of FIG. 15 for 50% RB utilization and FTP traffic are summarized in FIG. 21A, FIG. 21B, FIG. 22, and Table 1 and Table 2. Table 1 is associated with FIG. 21A and FIG. 21B; Table 2 is associated with FIG. 22. It can be seen that these gains can be over 30% in either the mean or five percentile throughput, depending on the application While some of the embodiments and modes described herein primarily concern vertical inter-cell interference coordination (ICIC) between cells of different layers, other embodiments such as that shown in FIG. 16 combine such vertical ICIC with horizontal ICIC between cells of the same layer.

FIG. 16 illustrates for the network scenario of FIG. 16A an example bandwidth partitioning scheme (in accordance with FIG. 3A) for macro layer ICIC. It will be appreciated that a similar approach could be implemented for micro (e.g., pico) layer ICIC. As shown in FIG. 16, the total bandwidth is split into two partitions or sub-bands (B1, B2) depicted by broad columns in FIG. 16. These partitions or sub-bands may be identical to that illustrated in FIG. 3A. For the example case of three adjacent macro cells as shown in FIG. 16, each partition/sub-band B1, B2 is further split into three sub-partitions B11, B12, B13, B21, B22, B23. It should be noted that the relative sizes of these sub-partitions are not necessarily to scale.

In one example assignment scenario for FIG. 16, the wireless terminals are first assigned to one of the sub-bands B1, B2 according to any suitable vertical ICIC technique including those described herein. In a next step, each macro wireless terminal is further assigned to one of the various partitions B11 to B23 according to any conventional vertical ICIC technique. It should be noted that a combined vertical/horizontal ICIC procedure can also be performed for terminals served in the micro cells (e.g., pico cells). Since micro cells are often sufficiently isolated from each other, this option has not been illustrated in FIG. 16.

Figure 17:
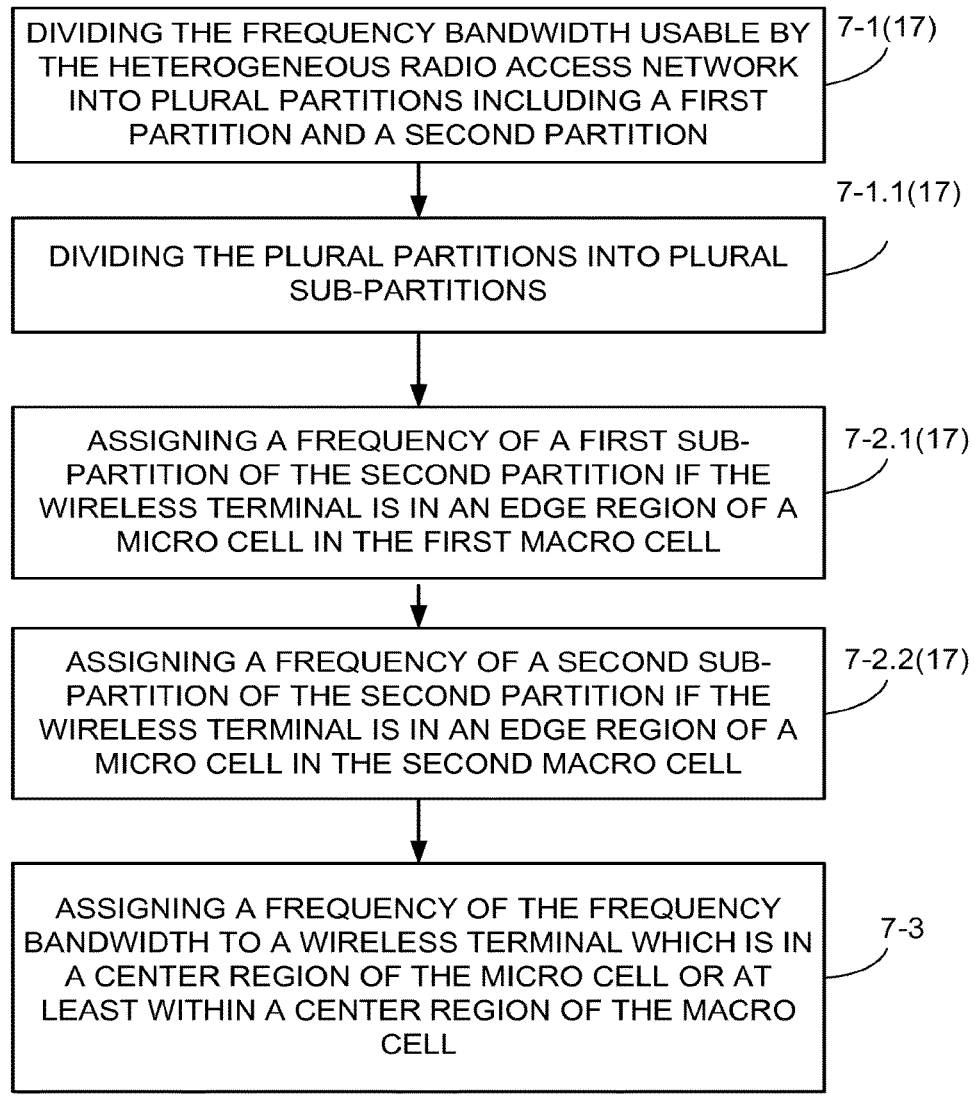

FIG. 17 shows example, representative acts or steps involved in a generic method of operating a heterogeneous radio access network in accordance with the sub-partitioned embodiments and/or modes of the technology disclosed herein. Act 7-1(17) comprises dividing the frequency bandwidth usable by the heterogeneous radio access network into plural partitions including a first partition (e.g., partition B1) and a second partition (partition B2). Act 7-1.1(17) comprises dividing the plural partitions into plural sub-partitions. Act 7-2.1(17) and act 7-2.2(17) collectively essentially correspond to generic act 7-2, the act of assigning a frequency of a partitioned portion (e.g., the second partition) to a wireless terminal in an edge region a micro cell. Act 7-2.1(17) comprises assigning a frequency of a first sub-partition of the second partition if the wireless terminal is in an edge region of a micro cell in the first macro cell. Act 7-2.1(17) comprises assigning a frequency of a second sub-partition of the second partition if the wireless terminal is in an edge region of a micro cell in the second macro cell. Act 7-3 comprises assigning a frequency of the frequency bandwidth to a wireless terminal which is in a center region of the micro cell or at least within a center region of the macro cell.

Both act 7-2.1(17) and act 7-2.2(17) are performed by schedulers of micro base stations, but are performed by schedulers of different micro base stations. For example, in the embodiment of FIG. 15 act 7-2.1(17) may be performed by micro base station of micro cell $28_{1-1}$ assigning a frequency of sub-partition B21 (since micro cell $28_{1-1}$ is in macro cell $22_1$), while act 7-2.2(17) may be performed by micro base station of micro cell $28_{2-1}$ assigning a frequency of sub-partition B22 (since micro cell $28_{2-1}$ is in macro cell $22_2$). Further it will be appreciated that other acts are also encompassed by the generic method of FIG. 17, such as a third micro base station (e.g., a micro base station of micro cell $28_{3-1}$) assigning a frequency of a third sub-partition (e.g., sub-partition B23) of the second partition if the wireless terminal is in an edge region of micro cell $28_{3-1}$, the micro cell $28_{3-1}$ being in third macro cell $22_3$.

In the embodiment of FIG. 15 and in accordance with the method of FIG. 17, the scheduler 36 of a particular macro base station of a macro cell which comprises the heterogeneous radio access network assigns, to a wireless terminal served by the particular macro cell, a frequency of a selected one of the sub-partitions of the first partition if the wireless terminal is in an edge region of the particular macro cell or if the wireless terminal substantially interferes with a cell other than the particular macro cell. For example, in the context of FIG. 15 the macro base station $24_1$ would assign a frequency from sub-partition B11 to a wireless terminal which either is in an edge region $54_1$ of the particular macro cell or which substantially interferes with a cell other than the particular macro cell. The selected sub-partition of the first partition which is assigned may be a sub-partition associated with the particular macro cell. For example, in FIG. 15 the sub-partition B11 may be associated with macro cell $22_1$ and thus used by the scheduler 36 of macro base station $24_1$ for assigning frequencies to macro edge and interfering wireless terminals. The scheduler 36 of the particular macro cell assigns frequencies to any center region wireless terminal or non-interfering wireless terminal, and in some embodiments may do so without regard to partitioning (e.g. any frequency of the entire usable bandwidth).

Figure 17A:
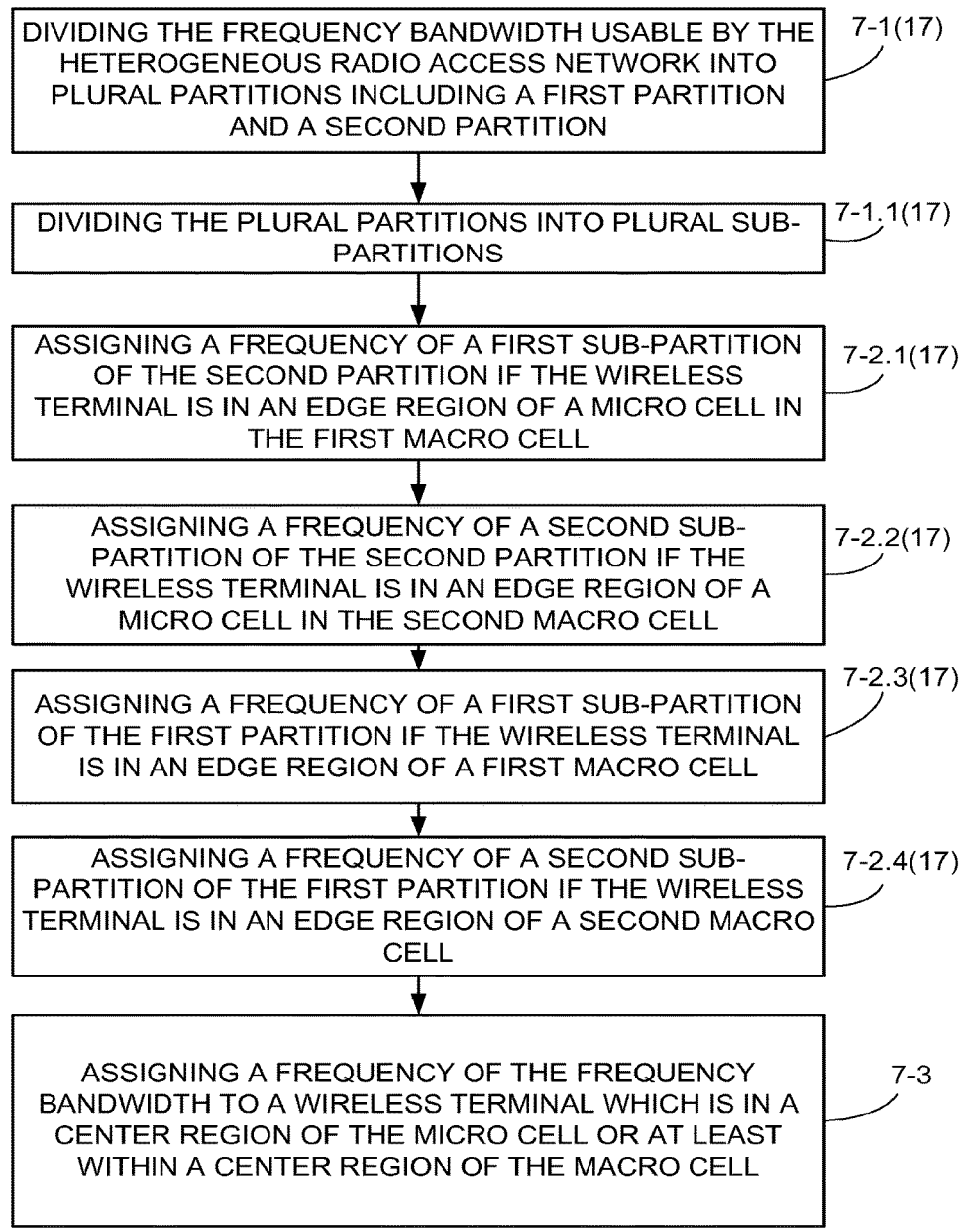

FIG. 17A shows basic, representative acts or steps involved in a sub-partitioning resource assignment strategy in which macro base stations assign frequencies in a first partition to wireless terminals which are in their respective edge regions. The method of FIG. 17A includes the acts 7-1(17), 7-1.1(17), 7-2.1(17), 7-2.2(17), and 7-3 of FIG. 17, as well as further acts 7-2.3(17A) and 7-2.4(17A). Act 7-2.3(17A) comprises assigning a frequency of a first sub-partition of the first partition if the wireless terminal is in an edge region of a first macro cell. Act 7-2.4(17A) comprises assigning a frequency of a second sub-partition of the first partition if the wireless terminal is in an edge region of a second macro cell. Act 7-2.3(17A) is performed by a scheduler 36 of a macro base station, such as the scheduler 36 of base station $24_1$ which uses the first sub-partition B11 to assign frequencies to wireless terminals in edge region $54_1$. Act 7-2.4(17A) is performed by a scheduler 36 of another macro base station, such as the scheduler 36 of base station $24_2$ which uses the second sub-partition B12 to assign frequencies to wireless terminals in edge region $54_2$.

Figure 17B:
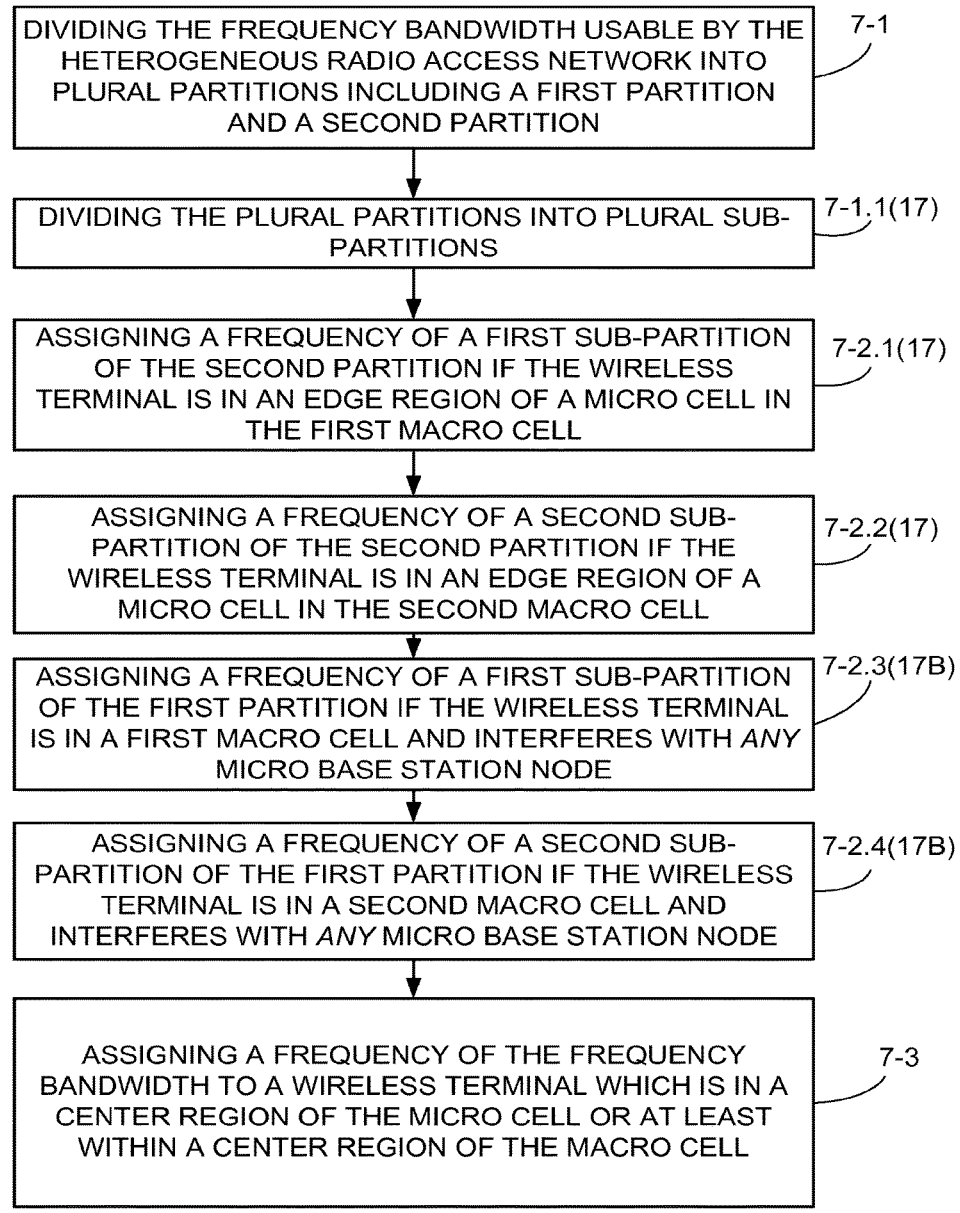

FIG. 17B shows basic, representative acts or steps involved in a sub-partitioning resource assignment strategy in which macro base stations assign frequencies in a first partition to wireless terminals which interfere with other cells, e.g., interfering UEs. The method of FIG. 17B is germane, e.g., to the embodiment and mode of FIG. 16. The method of FIG. 17B includes the acts 7-1(17), 7-1.1(17), 7-2.1(17), 7-2.2(17), and 7-3 of FIG. 17, as well as further acts 7-2.3(17B) and 7-2.4(17B). Act 7-2.3(17B) comprises assigning a frequency of a first sub-partition of the first partition if the wireless terminal is in a first macro cell and interferes with any micro base station node. Act 7-2.4(17B) comprises assigning a frequency of a second sub-partition of the first partition if the wireless terminal is in a second macro cell and interferes with any micro base station node. Act 7-2.3(17B) is performed by a scheduler 36 of a macro base station, such as the scheduler 36 of base station $24_1$ which uses the first sub-partition B11 to assign frequencies to interfering wireless terminals served by base station $24_1$. Act 7-2.4(17B) is performed by a scheduler 36 of another macro base station, such as the scheduler 36 of base station $24_2$ which uses the second sub-partition B12 to assign frequencies to interfering wireless terminals served by base station $24_2$.

Figure 17C:
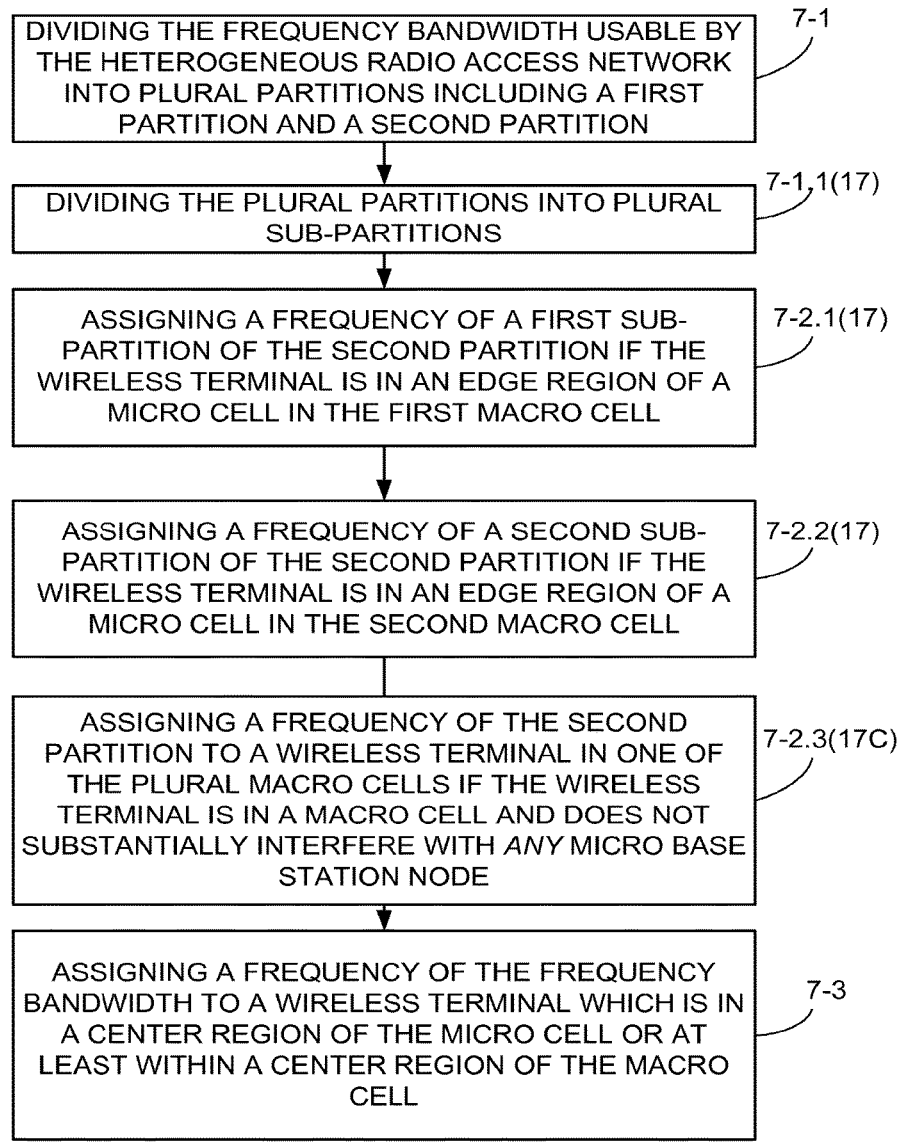

FIG. 17C shows basic, representative acts or steps involved in a sub-partitioning resource assignment strategy in which macro base stations may assign frequencies in the second partition to wireless terminals which do not interfere with other cells, e.g., non-interfering UEs. The method of FIG. 17C includes the acts 7-1(17), 7-1.1(17), 7-2.1(17), 7-2.2(17), and 7-3 of FIG. 17, as well as further act 7-2.3 (17C). In the method of FIG. 17C, a wireless terminal, served by a macro cell, may be assigned a frequency of the frequency bandwidth usable by the heterogeneous radio access network (e.g., without regard to partitioning) if the wireless terminal does not substantially interfere with a cell other than the particular macro cell. As illustrated in FIG. 17C, act 7-2.3(17C) particularly comprises assigning a frequency of the second partition to a wireless terminal in one of the plural macro cells if the wireless terminal is in a macro cell and does not substantially interfere with any micro base station node. Act 7-2.3(17C) is performed by a scheduler 36 of a macro base station which serves the non-interfering wireless terminal.

Figure 17D:
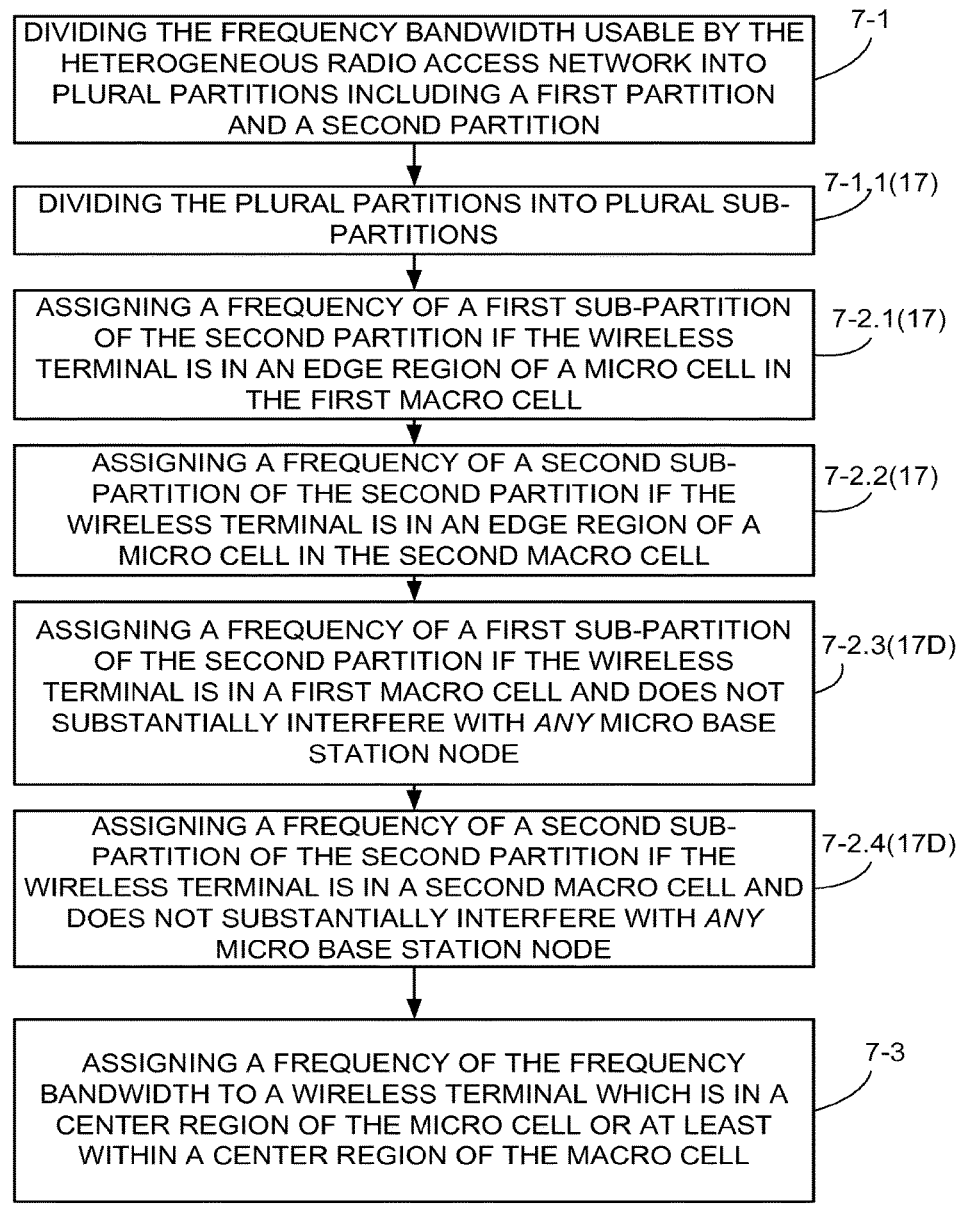

FIG. 17D shows basic, representative acts or steps involved in a sub-partitioning resource assignment strategy in which macro base stations may assign frequencies in the second partition to wireless terminals which do not interfere with any micro base station node. The method of FIG. 17D includes the acts 7-1(17), 7-1.1(17), 7-2.1(17), 7-2.2(17), and 7-3 of FIG. 17, as well as further act 7-2.3(17D) and act 7-2.4(17D). In the method of FIG. 17D, a wireless terminal, served by any one of the plural macro cells, may be assigned a frequency of the second partition if the wireless does not substantially interfere with any micro base station node. In this regard, act 7-2.3(17D) comprises assigning a frequency of a first sub-partition of the second partition if the wireless terminal is in a first macro cell and does not substantially interfere with any micro base station node. Act 7-2.4(17D) comprises assigning a frequency of a second sub-partition of the second partition if the wireless terminal is in a second macro cell and does not substantially interfere with any micro base station node. For example, in the context of FIG. 15, the scheduler 36 of macro base station $24_1$ may assign a frequency of partition B21 to a wireless terminal served by macro base station $24_1$ that does not substantially interfere with any micro base station node. Similarly, the scheduler 36 of macro base station $24_2$ may assign a frequency of partition B22 to a wireless terminal served by macro base station $24_2$ that does not substantially interfere with any micro base station node.

As evident from the preceding, a scheduler of a macro base station may be configured to assign, to a wireless terminal that it serves, a frequency of a selected one of the sub-partitions of the second partition, and the selected one of the sub-partitions of the second partition may be associated with the particular macro cell. For example, in conjunction with non-interfering wireless terminals and in the context of FIG. 15, sub-partition B21 may be associated with macro cell $22_1$ and macro base station $24_1$; sub-partition B22 may be associated with macro cell $22_2$ and macro base station $24_2$; and sub-partition B23 may be associated with macro cell $22_3$ and macro base station $24_3$.

In another example sub-partitioned embodiment wherein the base station node serves a particular macro cell comprising the plural macro cells, the scheduler of a particularly macro base station node may be configured to assign, to a wireless terminal that it serves, a frequency of the second partition if the wireless terminal substantially interferes with a macro cell other than the particular macro cell and does not substantially interfere with a micro cell.

What constitutes "substantial interference" may be determined relative to a threshold, such as a predetermined threshold. For example, the received power of a user A (e.g., wireless terminal) at a cell B may be used to determine if user a substantially interferes with cell B. It may be decided that substantial interference occurs if the received power from user A is larger than a predetermined threshold or among the highest received power signals from all users.

As reflected by acts such as act 7-2.1(17) and act 7-2.1 (17), for the sub-partitioning embodiments the scheduler 36 of a micro base station node may be configured to assign to the wireless terminal a frequency selected from a selected sub-partition of the second partition if the wireless terminal is in an edge region of the particular micro cell. In an example implementation, the selected sub-partition of the second partition may be associated with the macro cell in which the particular micro cell is located. For example, in the context of FIG. 15, sub-partition B21 may be associated with micro cell $28_{1-1}$ and/or micro cell $28_{1-2}$; sub-partition B22 may be associated with micro cell $28_{2-1}$ and/or micro cell $28_{2-2}$; and sub-partition B23 may be associated with micro cell $28_{3-1}$ and/or micro cell $28_{3-2}$.

In an example embodiment and mode, the frequency bandwidth the first sub-partition of the first partition is separated from the first sub-partition of the second partition by at least the second sub-partition of the first partition. For example, in the context of FIG. 15, sub-partition B11 is separated from sub-partition B21 by at least sub-partition B12 (and, in fact, also by sub-partition B13).

Typically a base station BS comprises units or functionalities other than those shown in FIG. 4, some of which are illustrated in FIG. 18. Among such other units or functionalities are communications interface 60 (to other nodes of the radio access network (RAN) or core network nodes); frame handler 62 (for frames or sub-frames communicated over interface 38 and thus the radio interface); frame handler 64 (for frames or sub-frames communicated by communications interface 60 between the base station BS and other nodes); signal handler 66; scheduler configurator 68; signal handler 70; data handler 70 and data handler 72, and applications 74. The frame handler 64 connects to signal handler 66 and data handler 70, while frame handler 62 connects to signal handler 70 and data handler 72.

In example embodiments, functionalities of a base station may be realized using electronic circuitry. For example, FIG. 18 shows an embodiment of an example base station BS wherein the scheduler 36 and other functionalities are realized by electronic circuitry and particularly by platform 90, the platform 90 being framed by broken lines in FIG. 18. The terminology "platform" is a way of describing how the functional units of the base station node can be implemented or realized by machine including electronic circuitry. One example platform 90 is a computer implementation wherein one or more of the framed elements including scheduler 36 are realized by one or more processors 92 which execute coded instructions and which use non-transitory signals in order to perform the various acts described herein. In such a computer implementation the scheduler 36 can comprise, in addition to a processor(s), memory section 93 (which in turn can comprise random access memory 94; read only memory 95; application memory 96 (which stores, e.g., coded instructions which can be executed by the processor to perform acts described herein); and any other memory such as cache memory, for example.

Typically the platform 90 of base station BS also comprises other input/output units or functionalities, some of which are illustrated in FIG. 18, such as keypad 100; audio input device 102 (e.g. microphone); visual input device 104 (e.g., camera); visual output device 106; and audio output device 108 (e.g., speaker). Other types of input/output devices can also be connected to or comprise base station BS.

In the example of FIG. 18 the platform 90 has been illustrated as computer-implemented or computer-based platforms. Another example platform suitable for the packet core network entity in particular is that of a hardware circuit, e.g., an application specific integrated circuit (ASIC) wherein circuit elements are structured and operated to perform the various acts described herein.

As explained with reference to FIG. 8, in some example embodiments and modes a partition plan may be downloaded from a management node 50 or the like to the scheduler 36 of a base station BS. Such downloaded partition plan may be carried by signals which are applied to base station BS over communication interface 60 and which are routed to signal handler 66. The signal handler 66 in turn provides the partition plan-bearing signals to scheduler configurator 68. The scheduler configurator 68 in turn provides or programs the partition plan into scheduler 36.

In another embodiment as exemplified by FIG. 9, the partition plan may instead or additionally be installed into the scheduler 36 through means other than a network download. For example, the partition plan may be input to scheduler 36 more directly, e.g., through memory 93 (e.g., a partition plan stored in ROM 95 or RAM 94) or an input device of the input/output section (such as keypad 100).

Typically a wireless terminal (UE) 30 also comprises units or functionalities other than those shown in FIG. 5. Some such other functionalities or units are illustrated in FIG. 19. Among such other units or functionalities are scheduler 136; frame handler 162 (for frames or sub-frames communicated over interface 44 and thus the radio interface); signal handler 170; data handler 172, and applications 174. The frame handler 164 connects to signal handler 170 and data handler 70, while frame handler 62 connects to signal handler 170 and data handler 172.

In example embodiments, functionalities of a base station may be realized using electronic circuitry. For example, FIG. 19 shows an embodiment wherein many functionalities of an example wireless terminal (UE) 30 are realized by electronic circuitry and particularly by platform 190, the platform 190 being framed by broken lines in FIG. 18. The terminology "platform" is a way of describing how the functional units of the wireless terminal (UE) 30 may be implemented or realized by machine including electronic circuitry. One example platform 190 is a computer implementation wherein one or more of the framed elements are realized by one or more processors 192 which execute coded instructions and which use non-transitory signals in order to perform the various acts described herein. In such a computer implementation the frame functionalities may comprise, in addition to a processor(s), memory section 193 (which in turn can comprise random access memory 194; read only memory 195; application memory 196 (which stores, e.g., coded instructions which can be executed by the processor to perform acts described herein); and any other memory such as cache memory, for example.

Typically the platform 190 of wireless terminal (UE) 30 also comprises other input/output units or functionalities, some of which are illustrated in FIG. 19, such as keypad 200; audio input device 202 (e.g. microphone); visual input device 204 (e.g., camera); visual output device 206; and audio output device 208 (e.g., speaker). Other types of input/output devices can also be connected to or comprise base station BS.

In the example of FIG. 19 the platform 190 has been illustrated as computer-implemented or computer-based platforms. Another example platform suitable for the framed functionalities, in particular is that of a hardware circuit, e.g., an application specific integrated circuit (ASIC) wherein circuit elements are structured and operated to perform the various acts described herein.

As used herein, a "wireless terminal" can be a mobile station or user equipment unit (UE) such as a mobile telephone ("cellular" telephone) or a laptop with wireless capability (e.g., mobile termination), and thus can be, for example, a portable, pocket, hand-held, computer-included, or car-mounted mobile devices which communicates voice and/or data via a radio access network. Moreover, a wireless terminal can be a fixed terminal which communicates voice and/or data via a radio access network.

An example criterion to identify cell-edge transceiver devices is called geometry. The geometry $G_u$ of a transceiver device u served by a base station BS0 is given by $$G_u = \frac{TxP_{BS0} \cdot PL_{BS0,u}}{\sum_{i \in S \setminus BS0} TxP_i \cdot PL_{i,u} + N},$$

where S is the set of adjacent base stations, TxP is the transmit power of the considered BS, PL is the pathloss from the transceiver device u to the considered base station, and N is the receiver noise power. By subjecting the geometry parameter derived for a particular transceiver device to, for example, a threshold decision, it can be determined whether or not the particular transceiver device is located at a cell edge.

The technology disclosed herein has primarily been exemplified in the context of E-UTRAN and an evolved Packet core (EPC), e.g., LTE/SAE. However, the technology disclosed herein is not limited to any particular network or technology/generation, since the person skilled in the art realize that the principles are applicable for other mobile systems as well, such as cdma2000, which currently also uses location area lists.

Advantageously, the technology disclosed herein increases cell edge throughput in heterogeneous interference limited environments while maintaining overall aggregate cell throughput.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A base station node of a heterogeneous radio access network, the heterogeneous radio access network comprising a macro layer including at least one macro cell served by a macro base station node and a micro layer including at least one micro cell served by a micro base station node, the base station node comprising:
    a terminal locator configured to obtain an indication of location of a wireless terminal in a cell served by the base station node, wherein:
        the cell is a micro cell and the base station node is a micro base station node; and
        the heterogeneous radio access network comprises plural macro cells and plural micro cells within each of the plural macro cells; and
    a scheduler configured to assign to the wireless terminal, based on the indication of location of the wireless terminal in the cell served by the base station node, a frequency of the frequency bandwidth usable by the base station node in the heterogeneous radio access network, wherein the frequency bandwidth usable by the heterogeneous radio access network is divided into plural partitions, the scheduler being configured to:
        assign a frequency from a frequency-partitioned portion of the frequency bandwidth usable by the base station node in the heterogeneous radio access network if the indication of location of the wireless terminal indicates that the wireless terminal is in an edge region of the cell served by the base station node, the frequency-partitioned portion being less than the entire frequency bandwidth usable by the base station node in the heterogeneous radio access network;
        assign a frequency from the frequency bandwidth usable by the base station node in the heterogeneous radio access network, including a portion of the frequency bandwidth usable by the base station node that is not included in the frequency partitioned portion, if the indication of location of the wireless terminal indicates that the wireless terminal is located elsewhere in the cell; and
        assign a frequency from a selected one of the plural partitions of the frequency bandwidth, the selected one of the plural partitions being a same partition which is used, by another base station node serving another micro cell in a same macro cell, to assign a frequency to another wireless terminal in an edge region of the another micro cell, but the selected one of the plural partitions being different from another partition which is used, by yet another base station node serving another micro cell in another macro cell which is adjacent to the macro cell, to assign a frequency to yet another wireless terminal in an edge region of the yet another micro cell.

2. The base station node of claim 1, further comprising electronic circuitry operable to serve as the scheduler.

3. The base station node of claim 1, wherein the scheduler is configured to assign a frequency from a second partition if the wireless terminal is in an edge region of the micro cell served by the micro base station node.

4. The base station node of claim 3, wherein the selected one of the plural partitions is a same partition that is used by a fourth micro base station node within a third macro cell to assign a frequency to a wireless terminal in an edge region of a fourth cell served by the fourth micro base station node which is in the third macro cell.

5. The base station node of claim 1, wherein the selected one of the plural partitions is a different partition than that which is used by a fourth micro base station node, the fourth micro base station node within the macro cell, to assign a frequency to any wireless terminal within a fourth cell served by the fourth micro base station node.

6. The base station node of claim 1, wherein the scheduler is further configured to assign the frequency from the selected one of plural partitions of the frequency bandwidth, the selected one of the plural partitions being a different partition than that which is used, by a fourth base station node serving a fourth micro cell in the same macro cell, to assign a frequency to another wireless terminal in an edge region of the fourth micro cell.

7. A base station node of a heterogeneous radio access network, the heterogeneous radio access network comprising a macro layer including at least one macro cell served by a macro base station node and a micro layer including at least one micro cell served by a micro base station node, the base station node comprising:
    a terminal locator configured to obtain an indication of location of a wireless terminal in a cell served by the base station node, wherein:
        the cell is a micro cell and the base station node is a micro base station node; and
        the heterogeneous radio access network comprises plural macro cells and plural micro cells within each of the plural macro cells; and
    a scheduler configured to assign to the wireless terminal, based on the indication of location of the wireless terminal in the cell served by the base station node, a frequency of the frequency bandwidth usable by the base station node in the heterogeneous radio access network, wherein the frequency bandwidth usable by the heterogeneous radio access network is divided into plural partitions, the scheduler being configured to:

assign a frequency from a frequency-partitioned portion of the frequency bandwidth usable by the base station node in the heterogeneous radio access network if the indication of location of the wireless terminal indicates that the wireless terminal is in an edge region of the cell served by the base station node, the frequency-partitioned portion being less than the entire frequency bandwidth usable by the base station node in the heterogeneous radio access network; and assign a frequency from the frequency bandwidth usable by the base station node in the heterogeneous radio access network, including a portion of the frequency bandwidth usable by the base station node that is not included in the frequency partitioned portion, if the indication of location of the wireless terminal indicates that the wireless terminal is located elsewhere in the cell; and wherein the plural partitions are divided into plural sub-partitions, wherein a first partition is associated with the plural macro cells and a second partition is associated with the plural micro cells, wherein a first sub-partition of the second partition is primarily for micro cells in a first macro cell and a second sub-partition of the second partition is primarily for micro cells in a second macro cell, wherein the base station node serves a particular micro cell comprising the plural micro cells, and wherein the scheduler is further configured to assign to the wireless terminal a frequency selected from a selected sub-partition of the second partition if the wireless terminal is in an edge region of the particular micro cell.

8. The base station node of claim 7, wherein the selected sub-partition of the second partition is associated with the macro cell in which the particular micro cell is located.

* * * * *